(12) United States Patent
Rivas Sabelle et al.

(10) Patent No.: US 10,698,374 B2
(45) Date of Patent: Jun. 30, 2020

(54) SYSTEM AND METHOD FOR MANAGING WATER OR OTHER TYPE OF FLUID

(71) Applicant: INGENIERIA WISECONN S.A., Santiago (CL)

(72) Inventors: Cristóbal Alberto Rivas Sabelle, Santiago (CL); José Francisco Ulloa Suárez, Santiago (CL); Max Mauricio Weinstein Crenovich, Santiago (CL)

(73) Assignee: Ingiieria Wiseconn S.A., Santiago (CL)

( * ) Notice: Subject to any disclaimer, the term of this patent is extended or adjusted under 35 U.S.C. 154(b) by 118 days.

(21) Appl. No.: 15/572,019

(22) PCT Filed: May 7, 2015

(86) PCT No.: PCT/CL2015/000033
§ 371 (c)(1),
(2) Date: Nov. 6, 2017

(87) PCT Pub. No.: WO2016/176787
PCT Pub. Date: Nov. 10, 2016

(65) Prior Publication Data
US 2019/0041816 A1     Feb. 7, 2019

(51) Int. Cl.
*G05B 19/042* (2006.01)
*A01G 25/16* (2006.01)
*E03B 1/02* (2006.01)
*E03B 1/00* (2006.01)

(52) U.S. Cl.
CPC ......... *G05B 19/042* (2013.01); *A01G 25/167* (2013.01); *E03B 1/00* (2013.01); *E03B 1/02* (2013.01); *G05B 2219/2625* (2013.01)

(58) Field of Classification Search
CPC .......... G05B 19/042; G05B 2219/2625; A01G 25/167; E03B 1/00; E03B 1/02
See application file for complete search history.

(56) References Cited

U.S. PATENT DOCUMENTS

| | | | | |
|---|---|---|---|---|
| 5,229,937 A | * | 7/1993 | Evelyn-Veere | A01G 25/16 700/284 |
| 5,444,611 A | * | 8/1995 | Woytowitz | A01G 25/16 137/624.2 |
| 6,267,298 B1 | | 7/2001 | Campbell | |
| 6,600,917 B1 | | 7/2003 | Maupin | |

(Continued)

*Primary Examiner* — Thomas C Lee
*Assistant Examiner* — Michael Tang
(74) *Attorney, Agent, or Firm* — Ladas & Parry LLP

(57) ABSTRACT

The present invention relates to a system and method for managing water or other fluid that provides monitoring and reliable control of the use of water or other fluid in a given territorial area, facilitating the management of water use or other fluid in processes where it is involved, for example in tasks of irrigating agricultural land or in industrial processes using fluids such as leaching. The system and method of the invention operates on the basis of a distributed monitoring and control logic implemented to control and monitor a hydraulic system located in the given territorial area by an arrangement of sensors, actuators and controllers deployed in communication with a network of nodes that allows a user to monitor, control and automate the use of water in that territorial area, reducing to almost zero user intervention in the process of monitoring and control to almost zero.

15 Claims, 20 Drawing Sheets

(56) References Cited

U.S. PATENT DOCUMENTS

| | | | |
|---|---|---|---|
| 7,089,066 B2 * | 8/2006 | Hesse | H04L 67/32 |
| | | | 165/254 |
| 7,245,991 B1 | 7/2007 | Woytowitz | |
| 8,108,077 B2 | 1/2012 | Smith et al. | |
| 8,265,911 B1 * | 9/2012 | Wu | E03B 1/00 |
| | | | 703/6 |
| 8,326,440 B2 | 12/2012 | Christfort | |
| 8,615,329 B2 * | 12/2013 | O'Connor | A01G 25/16 |
| | | | 137/1 |
| 10,380,274 B2 * | 8/2019 | Hu | G01F 1/00 |
| 2004/0100394 A1 | 5/2004 | Hitt | |
| 2005/0156067 A1 | 7/2005 | Ivans | |
| 2007/0249319 A1 * | 10/2007 | Faulkner | H04L 1/22 |
| | | | 455/402 |
| 2009/0216345 A1 | 8/2009 | Christfort | |
| 2009/0276102 A1 | 11/2009 | Smith et al. | |
| 2011/0058900 A1 * | 3/2011 | Furukawa | A01G 25/06 |
| | | | 405/43 |
| 2014/0305507 A1 | 10/2014 | Cheng et al. | |
| 2014/0309793 A1 | 10/2014 | Cheng et al. | |
| 2014/0371928 A1 * | 12/2014 | Ersavas | A01G 25/167 |
| | | | 700/284 |

\* cited by examiner

List of Symbols

Pump

Pump

Valve

Valve

Injector

Water source/tank

Stirrer

Upstream messages

Downstream messages

Other messages

Active

Inactive

ALARM

SYSTEM AND METHOD FOR MANAGING WATER OR OTHER TYPE OF FLUID

RELATED APPLICATION INFORMATION

This application is a 371 of International Application PCT/CL2015/000033 filed 7 May 2015, the content of which is incorporated herein by reference.

The present invention relates to a system and method for managing water or other fluid that provides monitoring and reliable control of the use of water or other fluid in a given territorial area, facilitating the management of water use or other fluid in processes where it is involved, for example in tasks of irrigating agricultural land or in industrial processes using fluids such as leaching.

The system and method of the invention operates on the basis of a distributed monitoring and control logic implemented to control and monitor a hydraulic system located in the given territorial area by an arrangement of sensors, actuators and controllers deployed in communication with a network of nodes that allows a user to monitor, control and automate the use of water in that territorial area, reducing the user intervention in the process of monitoring and control to almost zero.

BACKGROUND OF THE INVENTION

At present there are a number of solutions for the control and monitoring of irrigated areas, the common factor in these solutions being the supply of an automated irrigation system.

For example, the patent document U.S. Pat. No. 7,245,991 relates to an irrigation controller of distributed architecture, comprising a plurality of modules which are connected to the controller, each with a valve and a microcontroller, connected to a processor through a data bus. Such an arrangement of components allows bidirectional sending of messages, wherein each message contains operating instructions that are interpreted by the controllers to perform preset actions in response to such message. In this context, the solution proposed by U.S. Pat. No. 7,245,991 is a control system which is centralized in a single central controller incorporating the ability to control various modules connected to it in a distributed way. Then, although the control offered by the central controller of the document is distributed such control ends centralized in the controller of the invention, this being why the control arrangement and general monitoring of the hydraulic system is centralized, limiting the operation of said hydraulic system to the operation of the central controller. In addition, U.S. Pat. No. 7,245,991 has the limitation that each module being part of the irrigation system control must be connected directly to the controller this complicates the on-site implementation of the system by requiring that all information reaches the central controller directly.

Moreover, the patent document U.S. Pat. No. 6,600,917 proposes a distributed control network for the management of irrigation operations, wherein said network is comprised of a system incorporating a plurality of irrigation controllers, wherein each controller can transmit, receive and respond to commands initiated or communicated by any other network device, a host computer, a data bus connecting the irrigation controllers with the central computer, and a plurality of sensors and valves connected to the controllers. Additionally, the document U.S. Pat. No. 6,600,917 proposes local operation of the controllers, via a user interface or remotely via a wireless connection. In this regard, the relevant document discloses a network of controllers that operates in a distributed way, wherein each controller can operate on its own and wherein the transmission of information from sensors, programs and control functions is also possible to any controller on the network. However, the system disclosed in the document U.S. Pat. No. 6,600,917 does not consider the communication of controllers each other to respond to the system operation, performing requirements and responses that keep the system in operation according to that desired by a user. Indeed, nothing in document U.S. Pat. No. 6,600,917 allows anticipating a system that includes a network of nodes interconnected each other and associated with different equipment, sensors, actuators and controllers in the system, wherein such devices interact through the network to meet the requirements of the system components in order to maintain operation under a user-defined standard.

The patent document U.S. Pat. No. 6,267,298 relates to irrigation controllers interconnected in a neural network. Said document provides for the operation of different controllers, hydraulically connected each other by means of a defined hydraulic network, to be determined on the basis of the decisions made by each controller based on the state of operation of said hydraulic system, for example, at the water level of a common source of water and according to the irrigation schedule established in each controller. This type of control allows a dynamic adaptation of the operation of controllers to the network condition, facilitating the automatic control thereof. However, the document U.S. Pat. No. 6,267,298 does not define that in that communication between controllers, the ability to provide dynamic and active control system may be contemplated, in response to the operational requirements based on changes in state suffered by each component in the network. Indeed, document U.S. Pat. No. 6,267,298 only limits to modify the operation of the system before the detection of changes in state, with the system not being able to respond to those changes in order to bring the operation to a preset scenario, since it does not consider the operating condition of each component independently and, therefore, it does not establish a communication with respect to report on the condition state of each component to the network.

The patent application document US 2004/0100394 refers to a method for providing environmental control and monitoring, including a network of wireless nodes comprising an array of sensing nodes and actuating nodes, wherein each node includes a wireless transceiver, a processor and one of a sensor device or an actuator device. In this regard, the method comprises sending messages from a first node to a second node and the processing of that message in the second node, thus generating a control command to an actuator node based on the message content. In this regard the document US 2004/0100394 allows the control of the nodes network and hydraulic components associated therewith by a message containing information regarding the operation of each node, sending said messages to particular nodes that analyze the information and generate actions based on the same. Thus, document US 2004/0100394 has the disadvantage of limiting the operation of the system to node or nodes receiving the message generated by a particular node, reducing the possibility of responding to that message in full by the whole hydraulic network.

Considering the above, the need for a monitoring and control fully integrated system among the participating components and the communication network becomes evident, so that to allow managing the operation of the system, but also ensuring that the operation of each component thereof will remain within the conditions preset by a user. In addition, it is required that the management system comprises components to communicate each other hydraulically or through a data network, through which sensors, actuators and controllers define the operating conditions and determine the actions necessary to respond to said operating conditions, without limiting the action of the system or the responses the same can give to equipment previously defined, i.e. allowing said system to determine which equipment is to be acted in response to the relevant requirement.

Finally, the document US 2014/0371928 defines a wireless system for monitoring the environmental, soil or weather conditions and/or for controlling the irrigation and/or weather control in a farming site or property, including associated methods. The system and method defined in said document comprise a network of hydraulic components, a network of nodes in communication with sensors, actuators and controllers, wherein said controllers are arranged in such a way to receive, transmit and process information, wherein part of said information comprises on/off state conditions. In this context, the document US 2014/0371928 defines states of simple equipment and sets a communication architecture tor measurements, wherein the state of each equipment is sent to the network and stored, so that to compare the states by system, without directly affecting the states of other related equipment and belonging to the hydraulic network. Therefore, the communication of states proposed by the prior art mentioned only allows—in addition to simple states—comparisons at the level of system control in order to manage the network acting without directly intervening in the control, logics at the level of the hydraulic network.

DESCRIPTION OF THE INVENTION

The present invention relates to a system and method for the management of water, or other fluid, which provides reliable monitoring and control of water use in a given territorial area or field, facilitating the management of water use or other type of fluid in processes where it is involved, for example in the irrigation tasks of agricultural land or in industrial processes using fluids such as leaching.

Among the main objectives of the system and method of the invention, providing a comprehensive control of the operation of the system for water management should be mentioned, defining the hydraulically communicated components and through a network interface in which the operating data of the components are sent/received for the management of the system behavior against various requirements, thus resolving the main disadvantages present in systems and methods belonging to the prior art.

Furthermore, another object of the invention is that monitoring and control provided by the system and method may be reliable and, as required, with autonomous operation. To this effect, proposing an arrangement of hydraulic communication and data that is fully integrated into a network representing the operation of the system is necessary, defining relations of communication and data between each component. In this regard, the integrated arrangement of information and/or data communication in a network of nodes and the hydraulic communication in the network of hydraulic components allows the system to operate in full during the operation, responding accurately and quickly to different operating conditions that may arise during the operation of the system and getting the maintenance of the system under operation criteria as defined.

Another object of the method and system of the invention is to provide simple and intuitive monitoring and control by a user, allowing manipulation of the management system in real time and without the need for stops, wherein said user is constantly aware of the operation of the method and system, either by notification of alarms and/or warnings or through the recording of events in a server.

Finally, another object of the invention is to provide a method and system for the management of water easy to adapt to different configurations of hydraulic systems. Such ease of adaptation is achieved by the structure and definition of the basic components that are part of the system and method of the present application, making said components easy to arrange in various configurations according to user needs and requirements of the hydraulic system concerned.

To fulfill the objectives set, the invention comprises a water management system or other fluid providing reliable monitoring and control of water use in a territorial area divided into sectors, wherein said water management system comprises at least:

A hydraulic network located in the territorial area, comprising a set of hydraulic components hydraulically interconnected and located in the sectors of that territorial area, wherein each hydraulic component is associated with the area where it is located, wherein each hydraulic component of the hydraulic network is defined by operating parameters and operating variables, and A network of nodes located in the territorial area, comprising a set of nodes interconnected each other and localized (although not strictly necessary) in the sectors of that territorial area. These nodes are the key element of the nodes network, mainly comprising electronic devices with wired or wireless communication, data storage and connection to sensors, actuators and controllers, among others.

Considering the above, the system of the invention defines that at least a first node of the nodes network is in communication with at least one sensor, at least one actuator and at least one controller belonging to the system, wherein said communication comprises wireless data transmission or by cable corresponding to sensed variables of the operation, the acting of devices, the operating parameters and/or definition of the operating conditions.

Sensors measure the operating variables and/or operating parameters of one or more hydraulic components associated with any node, obtaining operational information of said hydraulic components and/or of their environment. In addition the actuators comprise actuating means for driving operating parameters and/or operating variables of one or more hydraulic components associated with any node, executing some action on an external element to the nodes network, while drivers are in communication with sensors and actuators, comprising at least one transmitter/receiver to send/receive inform ad on to/from the nodes network and at least one processor to define a condition of state of one or more hydraulic components associated with any node on the basis of the operation information that is obtained by the operating parameters and operating variables of said one or more hydraulic components.

In this respect, operation information means the set of operating parameters, operating variables, and any other information associated with one or more hydraulic components, wherein said operation information characterizes said one or more hydraulic components and is useful, among others, to obtain the state condition of one or more hydraulic components.

The state condition of any hydraulic component referred to in the preceding paragraphs is communicated to the network nodes via the transmitter/receiver of a controller in communication with an associated node, wherein said controller interacts with an actuator, by the same controller and/or other controller in order to actuate the operating parameters of another hydraulic component associated with said actuator. This communication relation allows giving response to the state condition of any hydraulic component in communication with said associated node, wherein said response takes place through the hydraulic communication existing between the hydraulic components. Furthermore, for each hydraulic component, node and/or sector, monitoring parameters associated with the work and operation of the system are defined, which are communicated through the nodes network to a user.

In an embodiment, the condition state is communicated and processed by all related nodes of the network, with response being generated in one or more hydraulic components of the hydraulic network simultaneously or in cascade.

Additionally, the at least one controller considered by the invention may be configured to generate response messages from at least one hydraulic component against the operation of the system, communicating such messages to the nodes network via at least a transmitter/receiver belonging to the equipment of the controller, wherein said messages can be communicated among hydraulic components upstream and/or downstream according to the dependence relation and association set.

Referring back to the definition of the invention, we have that for a given set of sectors the definition of control parameters of the hydraulic network located in said given set of sectors is possible. The control parameters are communicated to the nodes network belonging to that sector and, consequently, to the set of hydraulic components associated with said nodes. This communication scheme allows hydraulic components associated with the given set of sectors to be driven by the actuating means according to said control parameters.

Additionally, the invention comprises each hydraulic component having a hydraulic communication interface which associates with the hydraulic component directly connected upstream, wherein said hydraulic communication interface defines the interaction relationship among hydraulic components in order to set the hydraulic communication this is achieved by establishing a hydraulic dependence relationship between each hydraulic components and the hydraulic component directly located upstream. Indeed, the dependence relationship established by the hydraulic communication interface relates to a water supplier with a receiver component that receives water from said supplying component.

In this respect, through the hydraulic communication interface the relationship is set in such a sense that it defines the communication of the operation information of each hydraulic component, which can be classified as inputting operation information and outputting operation information according to such operation information going out from a component to the network or coming to a component from the network. Considering the above, the operation information from a first hydraulic component located downstream in relation to the at least second hydraulic component is called outputting operation information and it is used as input operation information in said at least one second hydraulic component. Thus, the outputting operation from the first hydraulic component is processed by the at least one controller associated with the second hydraulic component, driving said second hydraulic component in order to respond to the state condition of said first hydraulic component and/or to deliver information. Therefore, in one embodiment of the invention the operation information from the first hydraulic component—once its hydraulic dependence is defined through the hydraulic communication interface—relates to the inputting operation information from the at least a second hydraulic component, modifying its operating parameters, operating variables and/or state condition.

Regarding the state condition of any hydraulic component, it should be established that said condition is defined based on the information for the operating variables and/or operating parameters a said hydraulic component, wherein the state condition corresponds to the state of operation of each component at the time of reporting. In this context, the present invention provides that the operating states or state conditions should be predefined for each component, with general conditions being applicable to more than one particular component, such as active/inactive component, failure and/or turned-off and other states that may be specific to each component, for example in the case of subcomponents state that are part of a larger component or when the state originates from a specific variable of a component, as current variation in a regulated pump. Below there is a list of examples of possible conditions of general and specific state of the main hydraulic components of the invention.

General State Conditions:
Operational or active—the hydraulic component in question is operating within the operating parameters as established;
Off or inactive—the hydraulic component in question is inactive;
Failure—the hydraulic component is in a wrong state;
Forced stop—the hydraulic communication with the upstream component is interrupted or lost, i.e. there is no delivery of water or of other fluid by said component, which has not changed its state to turned-off;
Manual—the hydraulic component is in manual mode; and
Automatic—the hydraulic component is in automatic mode, wherein each preset state condition may comprise sub-states
Specific conditions of state or sub-states:
Low/high level for tank-type or water source hydraulic components, given by measuring the water level inside the tank and the lower/upper limits set as operating parameters as appropriate.

Other conditions of state for the main components of the system of the application are described based on the figures in the detailed description of the invention. Additionally, further state conditions not covered by the present application can be applied to the invention within its definition.

The state conditions defined in the list above are referred to as preset state conditions for each component, wherein the response by at least one hydraulic component against the state condition of another hydraulic component turns the condition state into a preset state condition for the associated hydraulic component.

One embodiment of the invention considers the preset state condition of each hydraulic component to be determined by a user, for example by scheduling operation times in the different sectors. However, alternative embodiments consider said state condition to be determined automatically by the system according to the operating parameters and conditions. In this respect, the invention comprises the option of allowing the user having complete control of the system. Wherein for example the control and monitoring parameters of the hydraulic network for each sector of the territorial area are defined by the user.

In this regard, according to preferred embodiments of the invention the water management system comprises a set of hydraulic components including at least one water source, at least one tank, at least one pump, at least one valve and/or at least one injector and other basic components of a hydraulic system as used in irrigation systems or leach pads for mining processes. Additionally, the system considers that one or more hydraulic components may comprise subcomponents involved in the operation of the hydraulic component, wherein such subcomponents may have their own state conditions as indicated above. In this context, it should be noted that the type and function of the hydraulic components deployed in the system will depend on the implementation of the water management system, so that the singularization of components only exemplifies the type of components used without limiting the scope of the invention to the inclusion of other components that are part of a hydraulic system.

Moreover, the water management system of the invention comprises at least one sensor associated with the environment or atmosphere, such as a sensor associated with measuring weather conditions and/or an associated sensor to measure the soil conditions, wherein said at least one sensor is located in at least one sector of the territorial area. In this regard, the at least one sensor associated with the environment can be further associated with the sector wherein it is located, being in wired or wireless communication with at least one node of the nodes network. Said at least one sensor associated with the environment or atmosphere can gather information communicated to the system by the nodes network being used as operating parameter that can affect the operation of the system.

In fact, the present invention considers the use of different types of sensors for measuring the system's operating variables both with respect to the operation of the hydraulic components and to the behavior of the environment or atmosphere where the system is located (climate/soil including plant/irrigation). Among the weather sensors, sensors for temperature, relative humidity, wind speed, wind direction, rain, sunlight, atmospheric pressure and photosynthetic photon flux (ON) can be mentioned. Among irrigation sensors, we can mention sensors of flow, electrical conductivity (EC), level and pressure.

Among soil sensors (included those of the plant) we find gauge probes for trunk, electrical conductivity (EC), soil temperature, soil moisture, size of plant size of fruit, leaf temperature, leaf humidity, soil tension and soil potential, among others.

In addition, other sensors not classified under climate, soil or irrigation may comprise dry contact sensors, voltage, battery charge, current, auxiliary con tact, switch, terminal board switch, automatic switch, manual switch and Off switch, among others.

Referring back to the definition of the territorial area divided into sectors, an embodiment of the invention comprises those sectors to be classified in irrigation sectors, sectors of soil and/or climate sectors, with each sector of the territorial area being classified according to one or a combination of said classifications, where:

The irrigation sector is that where at least one hydraulic component is located, comprising a set of control and monitoring parameters associated with the irrigation of said sector;

The soil sector is that where at least one sensor associated with the soil is located, comprising a set of control and monitoring parameters associated with the soil analysis; and The climate sector is that where at least one sensor associated with the weather is associated, comprising a set of control and monitoring parameters associated with the climate analysis of the environment.

In this regard, it is relevant to consider that other sector classifications may be used according to the requirements of the system and/or user, wherein said classifications are considered part of the definition of the invention.

The classification of sectors in one of the above classifications can be automatically determined by the system or defined by a user. Additionally, the invention considers the creation of various classifications for sectors, depending on the type of application of water management system and the user's desire. Additionally, sector can mean a subdivision of a lot, wherein the classification of the type of sector is not exclusive to each other for the purposes of various configurations such as irrigation scheduling and for the tools of analysis offered by the system. In this respect, and for the purposes of analysis, the sectors can be subdivided into blocks, this being the minimum unit of the territorial area, wherein each block has at least one actuator associated therewith.

Considering the above, one embodiment of the invention provides for the allocation of different types of soil within the territorial area in question. Wherein each type of soil is defined by sectors and/or the blocks making up a sector. In this context, we have various types of soil that may include day, sand, loam, loamy clay, loamy sand or combinations thereof, being it possible to establish certain operating actions depending on the type of soil, with this soil playing a part as operating parameters of the system. In this respect, the information on the type of soil can be supplemented with the sensor or sensors associated thereto, which provide real-time information on the soil conditions that are monitored by the sensors.

Moreover, an alternative embodiment of the invention comprises incorporating into the system a set of alarms and warnings in communicating with at least one user of the system, wherein the alarms are associated with the operation of the hydraulic network and its hydraulic components, communicating abnormal operating conditions and activating preset actions to correct these abnormal conditions, and wherein the warnings are associated with the monitoring of the environment, such as climate and soil, communicating conditions of the environment preset as outside the normal parameters. The communication of alarms and warnings to the user or users of the system is done by warning equipment deployed in the territorial area, messages sent to a water management server, text messages sent to the user and/or entails automatically sent by the e-mail system predefined by the user or users. Additionally, the user or users of the system may be authorized to accept, ignore or reject the alarms and warnings received In this context, one should take into consideration that each alarm and/or warning is associated with at least one sensor, which measurement gave rise to the alarm and/or warning and, therefore, with at least one sector associated with said sensor. In addition, the system of water management allows defining the operating parameters of alarms and warnings, as well as the activation conditions thereof, the times that will be used to activate and act against a particular condition and; or the type of warning to be communicates in the activation of the alarm and/or warning. Regarding the system's nodes network, one embodiment of the invention comprises at least one primary node or gateway node (Gateway), which coordinates the operation of the communication in the nodes network, wherein said communication can be wired and/or wireless. In addition, said main node can collect and store values of sensors, actuators and/or controllers, sending the information to at least one server. The gateway node performs the general coordinator tasks, such as time synchronization, assignment of addresses, etc., and also acts as a bridge between said nodes network and at least one server. In no case the absence of communication to the server, or lack of this primary node, will turn the system into non-operative, since one of the features of the invention is its robustness, being based on a distributed logic and with each node being "aware" of its mode of operation and interactions, which ensures the operating continuity of the system.

In this regard, according to one embodiment the system of the invention comprises at least one database that records the operation history of the water management system, including information that can cover all aspects of the system's operation, for example from its variables, parameters and state conditions to driving of alarms and responses against them.

As already implicitly stated in the preceding paragraphs, the invention may comprise a user interface in communication with the system, particularly with the at least one server, wherein said user interface allows monitoring and control of hydraulic components and water management by the user. Said user interface provides all the management and visualization tools required to show the operation of the system and the method of the invention, both generally and detailed, and to handle this information in order to modify the operation of the system and the method and/or to evaluate said operation.

Additionally, the present invention considers a method of water management or other fluid, which provides reliable monitoring and control of the use of water or other fluid in a territorial area divided into sectors, wherein said method is implemented in the system of the invention.

The Main Steps of the Method are the Following:

Defining a state condition of at least any first hydraulic component of the hydraulic network, wherein for example said component is associated with a first node, identifying the operating variables and/or operating parameters of the first hydraulic component based at least on one sensor, actuator and/or controller associated with said first hydraulic component, wherein said operation information includes operating variables and/or operating parameters of the first hydraulic component;

Communicating the condition of state from the first node to the nodes network,

Identifying at least any second hydraulic component of the hydraulic network associated with the first node or a second node, wherein the acting of said second hydraulic component allows to convert the state condition of the first hydraulic component into a preset state condition for said first hydraulic component.

Processing the state condition of the first hydraulic component in the first or second node associated with the second hydraulic component identified in the previous stage, particularly by at least one controller associated with said second hydraulic component;

Setting a response to that state condition by said at least one controller associated with the second hydraulic component, Driving the second hydraulic component by at least one actuator associated with said second hydraulic component, so that its operating variables and/or operating parameters allow converting the state condition of the first hydraulic component into a preset state condition for that component, employing hydraulic communication between hydraulic components.

Furthermore, the method of the invention comprises:

Defining for a given set of sectors, control parameters of the hydraulic system located in that particular set of sectors, which are communicated to the nodes network belonging to that sector and, consequently, to the set of hydraulic components associated with said nodes, which are driven by the actuating means according to said control parameters; and Defining for each hydraulic component, node and/or sector, monitoring parameters associated with the functioning and operation of the system, which are communicated through the nodes network to a user.

It has been established that the definition of the state conditions of the hydraulic components is performed by the controller associated with said hydraulic component via at least one network node, wherein a processor of said controller acquires the operation information in order to define the condition of state.

Moreover, the communication of the state condition is done through the emitting means present in the controller, which send information to the system's nodes network, specifically to other hydraulic components related, for example, through communication between nodes and controllers.

Considering the above, we have that the step of identifying at least one second hydraulic component of the hydraulic network comprises going through the hydraulic network upstream of the first hydraulic component using a hydraulic communication interface of each hydraulic component and driving one or more second hydraulic components upstream to respond to the condition of state of the first hydraulic component located downstream and/or to provide information. In this regard, as indicated above, the hydraulic communication interface associates the operation information of the first hydraulic component, or the outputting operation information with the inputting operation information of the second hydraulic component connected upstream directly.

Then, the processing of information is performed on the controller processor associated with it or the hydraulic components that have the potential to respond to the condition of state, in particular, with the hydraulic component or components identified in the stage previously detailed.

Finally, after the information is processed, a response is set that will drive the hydraulic component giving response to the state condition for the purposes of communicating—through the hydraulic communication interface—the response to the state component whose state should return to a preset condition state, thus generating dynamic control over the system and maintaining it at the level of operation desired against fluctuations in the operation.

In this regard, the use of the state conditions enables the system to be configured in such a way each relevant component has preset conditions at all times during operation, generating dynamic responses according to changes in the operation of each component and thus, of the system as a whole. Additionally, this type of control based on the communication state reduces the system's communication complexity, sending information through the nodes network and identifying the component or components that can respond to such information especially considering the hydraulic communication interface between components that is the way by which the drive of each component influences on the component located downstream.

Then, the present invention can overcome the problems present in the prior art by providing—through its distributed logic and based on the condition of states—reliable monitoring and control of water use in a given territorial area, which results in facilitating the management of water use or other fluid in the processes where it is involved. In this regard, it should be noted that it also includes the management of any other kind of fluid, in the understanding that said any other type of fluid is similar to water in its ability to go through a hydraulic communication system. Then, the invention may comprise both any fluid of the group employed in irrigation operations, such as water and water with additives, and other fluids used in industrial and mining processes, such as leaching, wherein fluids as acidulated water, PLS, ILS, refining, etc. take part.

Additionally, it is possible to clarify that a technical effect of the invention is that the system operation occurs at different levels or layers integrated with each other; thus, for example there is a hydraulic level, comprised of hydraulic components and communication between them, a network level, comprised of the nodes network and the existing communication between said nodes, a territorial level, comprised of the components that define the territorial area, such as sectors, and the association between said components, and a level of water management, comprised of the relationship between the territorial area and the equipment located therein. This distribution of operation in layers integrated with each other is achieved through the configuration of all elements of the system and the control structure established by the invention.

BRIEF DESCRIPTION OF THE FIGURES

As part of the present application the following representative figures of the present invention are presented, which show preferred embodiments thereof and therefore, should not be considered as limiting the definition of the application.

DETAILED DESCRIPTION OF PREFERRED EMBODIMENTS

Figure 1:
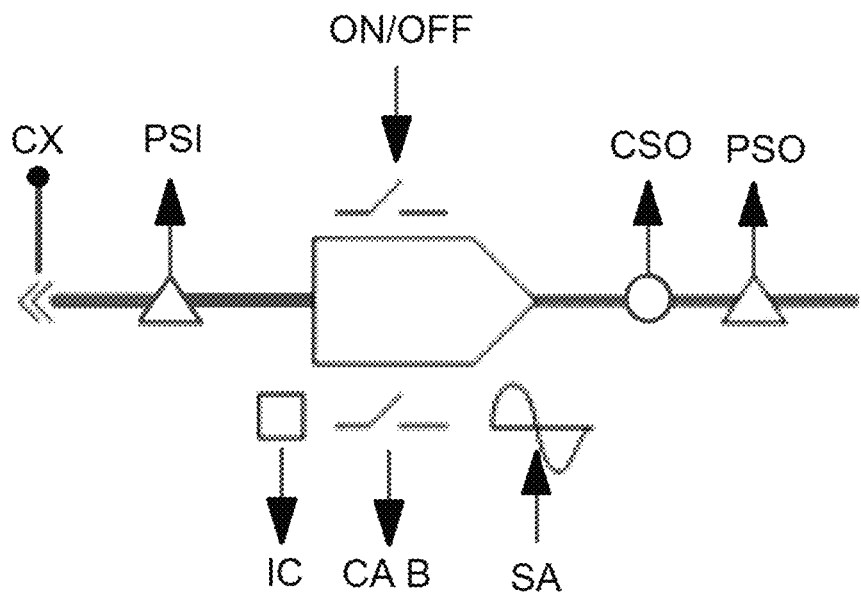
FIG. 1: A schematic diagram of a fluid pump as part of the hydraulic components of the system is shown.

In FIG. 1 a representative diagram of a pump as a hydraulic component of the invention can be seen, with its communication interface (Cx) being defined as the information corresponding to the input of said component, i.e., considering the pump as a component located downstream other components that are in communication therewith. Therefore, said communication interface defines the hydraulic dependence and interaction of input and output variables based on the water supplying component. In an alternative not shown for the scheme of FIG. 1, the hydraulic communication interface of the pump can relate to the information corresponding to the output of said component, that is, considering the pump as a component located upstream of the other components that are in communication therewith. Therefore said communication interface defines the hydraulic dependence and interaction of input and output variables based on the water receiving component.

In this regard, according to FIG. 1 the pump as a hydraulic component is associated with variables that may include the input pressure, measured by a PSI sensor in FIG. 1, the output pressure measured by a PSO sensor in FIG. 1, and the flow delivered by the pump, which can be measured by a flowmeter referred to as CSO in FIG. 1. Furthermore, the pump as a system component may comprise other types of sensors for measuring such operating parameters as the pump's motor current, measured by a sensor IC in FIG. 1 and the verification of the operation, by an auxiliary contact sensor referred to as CA B in FIG. 1. Moreover, the pump as a hydraulic component may be associated with operating parameters obtained by the actuators as a contactor, which drives the pump to turn it on or off and referred to as ON/OFF in FIG. 1, and/or a frequency adjuster to vary the operation of the pump, referred to as SA in FIG. 1, as required.

Then, it can be inferred from FIG. 1 that a hydraulic component may be associated with one or more variables determined by sensors and operating parameters determined by actuators, wherein said sensors and actuators provide information characterizing the operation of the hydraulic component and, therefore, allowing obtaining the state of operation or condition thereof. This applies to all major components of a system for the management of water or other fluid, shown in FIGS. 2 to 5*a* and 5*b*.

Additionally, among the operating parameters of the components any kind of parameter previously set or programmed for that component can be considered, for example, in the case of the pump, other operating parameters may comprise: Delayed ignition, delayed stopping, maximum/minimum pressure to be reached by the input/output pressure, stabilization time of the operation (input/output pressures), maximum/minimum flow values, maximum current, etc. This shows that the configuration of the invention by hydraulic components connected each other and in relation to a network level allows a number of control parameters that facilitate the operation, control and monitoring of the system; thus the use of water can be managed in a reliably and safely way.

Moreover, according to an embodiment of the invention the pump shown in FIG. 1 can communicate through a CX hydraulic communication interface with components directly connected upstream, among which the water source, tank, another pump and/or valve can be mentioned.

Finally, according to a preferred embodiment of the invention, the pump has different preset state conditions, among which:

Operation: The pump is operating; the condition for this state is the system can detect that the pump is active and it has a positive feedback, if any.

Fault: This state occurs when the pump is in a wrong state or there is no water flow, wherein condition for this state to become active is the pump having a state that is not equal to that of the auxiliary contact CA B or because the flow does not increase after a certain time.

Off: This condition occurs with the condition of pump stopping.

Forced stop: This state occurs when the component directly located upstream does not deliver water, either because of a fault condition or because it is inactive or off.

Manual: This state occurs when the system has been configured to operate the pump in manual state.

Figure 2:
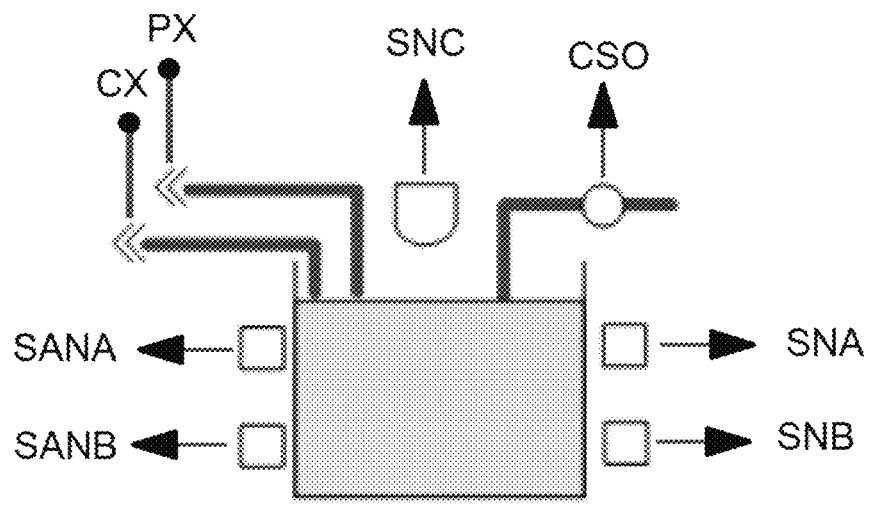
FIG. 2: A schematic diagram of a water source as part of the hydraulic components of the system is shown.

As previously indicated, this same logic of definition of hydraulic components is used for all components that are part of the system. In fact, FIGS. 2 to 6 show the definition of different devices/elements as hydraulic components of the system the same way as in FIG. 1 for the pump. In FIG. 2 a representative diagram of a water source as a hydraulic component of the invention can be seen, with its communication interface (Cx) being defined as the information corresponding to the input of said component, i.e., considering the water source as a component located downstream other components that are in communication therewith. Therefore, said communication interface defines the hydraulic dependence and interaction of input and output variables.

In this regard, according to FIG. 2 the water source as hydraulic component is associated with variables, among which we can mention the level of water measured by level sensors as a continuous level sensor CLS, high level sensor HLS sensor and/or low level sensor LLS, wherein said sensors become active with the change of level and when the lower/upper limits are exceeded, as appropriate. Another kind of variables correspond to the output flow, measured by a flowmeter referred to as CSO and variables associated with the alarms of level, measured by high level sensors alarm HLSA and low level sensors alarm LLSL.

Additionally, among the operating parameters of the components any kind of parameter previously set or programmed for that component can be considered, for example, in the case of the water source, other operating parameters may comprise upper height limit for normal operation, lower height limit for normal operation and filling mode, among others. For example, regarding the mode of filling, there are alternatives available that may comprise filling the water source while not reaching the upper height (source always full) or filling when the lower height is reached (source always at a certain minimum level).

Moreover, according to an embodiment of the invention the water source shown in FIG. 2 can communicate through a CX hydraulic communication interface with components directly connected upstream, among which pumps, valves and/or a preferred water supplier can be mentioned.

Finally, according to a preferred embodiment of the invention, the water source has different preset state conditions, among which:

Operation: The source is operating, the condition of this state is the system can detect that the water level is within the parameters set.

Low level: This condition occurs when the source is without water; this condition occurs when the water level is below the lower limit set.

Forced stopping: This state occurs when the component located directly upstream does not deliver water, either because of a fault condition or because is inactive or off.

Figure 3:
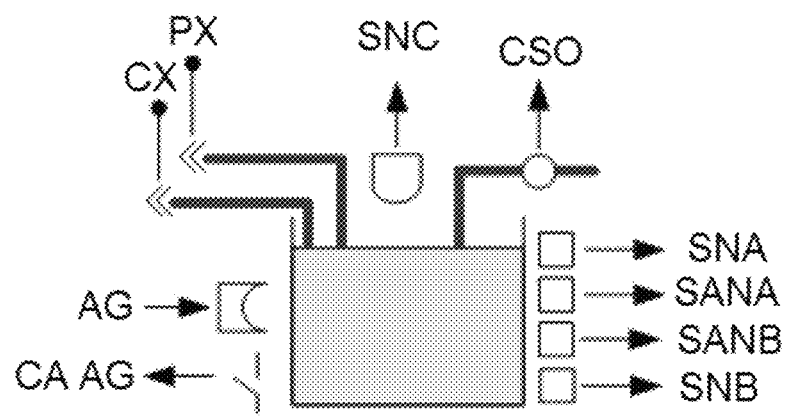
FIG. 3: A schematic diagram of a tank as part of the hydraulic components of the system is shown.

In FIG. 3 a representative diagram of a tank as a hydraulic component of the invention can be seen, with its communication interface (Cx) being defined as the information corresponding to the input of said component, i.e., considering the tank as a component located downstream other components that are in communication therewith. Therefore said communication interface defines the hydraulic dependence and interaction of input and output variables.

In this regard, according to FIG. 3 the tank as hydraulic component is associated with variables, among which we can mention the level of water measured by level sensors as a continuous level sensor CLS, high level sensor HLS sensor and/or low level sensor LLS, wherein said sensors become active with the change of level, and when the lower/upper are exceeded, as appropriate. Another kind of variables correspond to the output flow, measured by a flowmeter referred to as CSO and variables associated with the alarms of level, measured by high level sensors alarm HLSA and low level sensors alarm LLSL. Moreover, in case of having subcomponents as a stirrer, the tank may comprise sensors associated with determining the state of said subcomponents, such as an auxiliary contact sensor referred to as CA AG in FIG. 3. Moreover, the tank as hydraulic component may be associated with operating parameters obtained by actuators; this situation applies when there are subcomponents associated with the tank, such as a stirrer. In fact, the stirrer itself is an actuator comprising a stirrer contactor present in the tank for the driving of said subcomponent.

Additionally, among the operating parameters of the components any kind of parameter previously set or programmed for that component can be considered, for example, in the case of the tank, other operating parameters may comprise: upper height limit for normal operation, lower height limit for normal operation and filling mode, among others, such as that shown for the water source. Also, if the tank has subcomponents as a stirrer, other operating parameters associated with that subcomponent may be considered, such as: operating time of the stirrers as programmed before fertilizing irrigation or pre-stirring time, operating/off time of the stirrers during the fertilizing irrigation or on/off time for active fertilization, etc.

Moreover, according to an embodiment of the invention the tank shown in FIG. 3 can communicate through a CX hydraulic communication interface with components directly connected upstream, among which pumps, valves and/or a preferred water supplier referred to as can be mentioned.

Finally, according to a preferred embodiment of the invention, the tank has different preset state conditions, among which:

Operation: The tank is operating, the condition of this state is the system can detect that the water level is within the parameters set.

Low level: This condition occurs when the source is without water; this condition occurs when the water level is below the lower limit set.

Forced stopping: This state occurs when the component located directly upstream does not deliver water, either because of a fault condition or because is inactive or off.

Moreover, there are other possible conditions of state associated with the subcomponents of the tank, such as the stirrer, for which the following preset state conditions should exist:

Operation: The stirrer is operating and has positive feedback, if available.

Off: The stirrer is turned off and has positive feedback, if available.

Fault: The stirrer is in wrong state, which condition occurs when the state of the stirrer and the value of the auxiliary contact are inconsistent.

Manual: The stirrer is ready to be operated manually.

Figure 4:
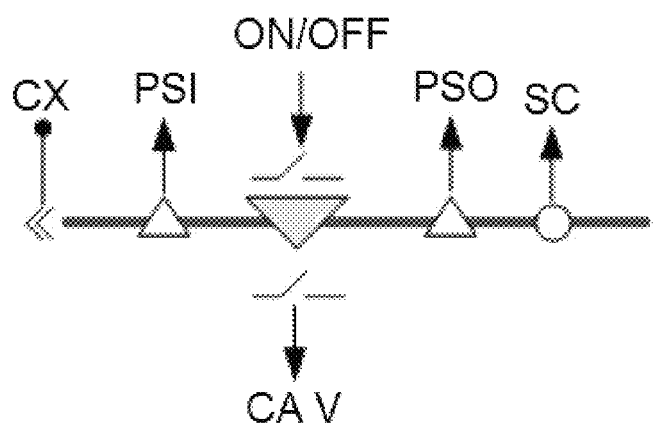
FIG. 4: A schematic diagram of a valve as part of the hydraulic components of the system is shown.

In FIG. 4 a representative diagram of a valve as a hydraulic component of the invention can be seen, with its communication interface (Cx) being defined as the information corresponding to the input of said component, i.e., considering the valve as a component located downstream other components that are in communication therewith. Therefore, said communication interface defines the hydraulic dependence and interaction of input and output variables.

In this regard, according to FIG. 4 the valve as hydraulic component is associated with variables, including input pressure measured by a pressure sensor PSI, the output pressure measured by a PSO sensor, and the flow measured by a flow sensor SC. Other variables may comprise obtaining the state of the valve, for example, using a dry contact sensor (CA V). Moreover, the valve as a hydraulic component may be associated with operating parameters obtained by actuators, for example a solenoid contactor for the operation of the valve, referred to as ON/OFF in FIG. 4. Additionally, among the operating parameters of the components any kind of parameter previously set or programmed for that component can be considered, for example, in the case of the valve, other operating parameters may comprise: maximum/minimum input/output limit, stabilization time of the input/output pressure, maximum/minimum flow limits, delayed ignition/stopping, maximum difference of pressure between input and output, stabilization time of the difference of pressure, etc.

Moreover, according to an embodiment of the invention the valve shown in FIG. 1 can communicate through a CX hydraulic communication interface with components directly connected upstream, among which the water source, tanks, pumps and/or other valves can be mentioned.

Finally, according to a preferred embodiment of the invention, the tank has different preset state conditions, among which:

Operation: The valve is open; the condition for this state is the valve to be active.

Off: The valve is closed; the condition for this state is the valve to be inactive.

Fault: This condition occurs when the valve is activated hut not opened or when it is inactivated but not closed; the condition is the valve to be under a different reference than the state of the CA V auxiliary contactor.

Force stopping: This state occurs when the component located directly upstream does not deliver o water, either because of a fault or because it is inactive or off.

Manual: the valve is ready for manual operation.

Figure 5A:
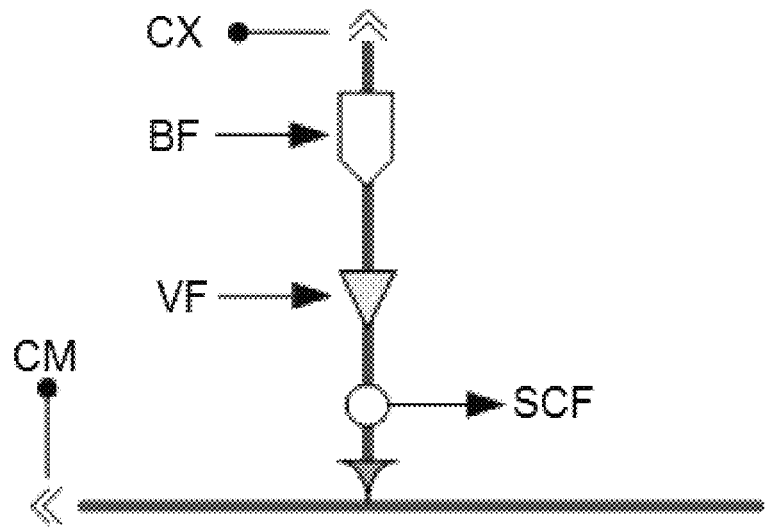
FIG. 5*a*: A schematic diagram of a fertilizer injector as part of the hydraulic components of the system is shown.
Figure 5B:
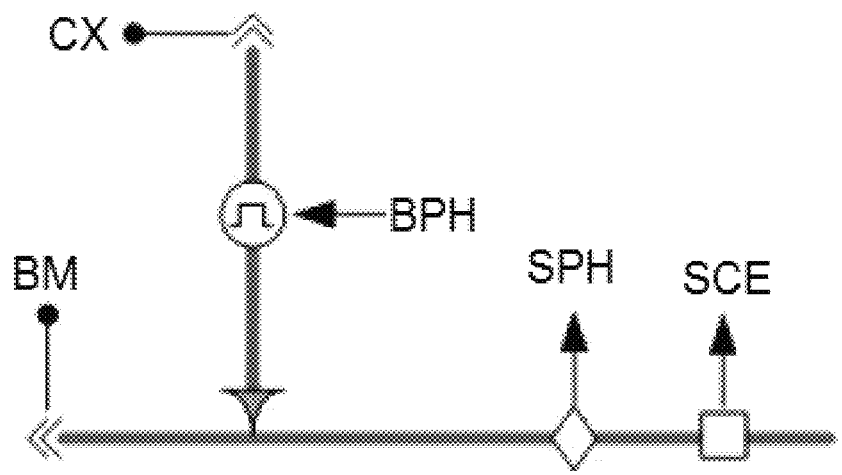
FIG. 5*b*: A schematic diagram of a pH injector as part of the hydraulic components of the system is shown.

In FIGS. 5a and 5b representative diagrams of a fertilizing injector and a pH injector can be respectively seen as hydraulic components of the invention, with their communication interface (Cx) being defined as the information corresponding to the input of said components, i.e., considering the injectors as a component located downstream other components that are in communication therewith. Therefore, said communication interface defines the hydraulic dependence (preferably a tank in this case) and the interaction of input and output variables.

In this regard, according to FIGS. 5a and 5b the injectors as hydraulic components are associated with variables. Among these variables the following are included: the flow rate measured by the fertilizer flow sensor referred to as SCF in FIG. 5a, the pH, measured by the pH sensor referred to as SCE in FIG. 5b, and the conductivity sensor, measured by the electrical conductivity sensor referred to as SCE in FIG. 5b. Moreover, the injectors as hydraulic components can be associated with the operating parameters obtained by the actuators, for example with an injector valve and an injector pump, respectively referred to as VF and BF in FIG. 5a in the case of fertilizer injector, while for pH injector an actuator may be associated with a contactor with acid injection pump, referred to as BPH in FIG. 5b.

Additionally, among the operating parameters of the components any kind of parameter previously set or programmed for that component can be considered, for example, in the case of the fertilizer injector, other operating parameters may comprise: maximum/minimum flow of the injector and rated flow of the injector, among others. In addition, for the pH injector other operating parameters may comprise: delayed in the ignition of the pH control/conductivity alarm, stabilization of the pH alarm/conductivity time, pH tolerance, pump flow, passing frequency of the pH pump, time in which the pH adjustment takes place, upper/lower pH limit/conductivity, etc.

Moreover, according to an embodiment of the invention the injector shown in FIG. 5a can communicate through a CX hydraulic communication interface—CM in FIG. 5a—with components directly connected upstream, among which water sources, pumps, and/or valves can be mentioned, while being also able to communicate through a CX hydraulic interface mainly associated with a tank located directly upstream the injector.

Regarding the pH injector shown in FIG. 5b, this component can communicate through a hydraulic communication interface—BM in FIG. 5b—with components directly connected upstream, among which water sources, pumps, and/or valves can be mentioned, which must be operating for the injector driving. In addition, the pH injector can also communicate through a CX hydraulic interface mainly associated with a tank located directly upstream the injector.

Finally, according to a preferred embodiment of the invention, the injectors have different preset state conditions, among which:

Operation: The fertilizer injector and/or pH control is operating, as appropriate, i.e., all elements of the injectors are operating without faults.

Off: The fertilizer injector and/or pH control is stopped without fault.

Fault: This condition occurs when the valves and/or pumps associated with the injectors are in a state of failure.

Forced stopping: This condition occurs when the component directly located upstream, i.e. that connected by the CX hydraulic communication interface does not deliver water, either because of a fault or because it is inactive or off.

Manual: The fertilizer injector and/or pH control are prepared for manual operation.

Examples of Operation

In FIGS. 6a-11b a series of schemes is shown for a configuration that serves as example of the system of the invention comprising, from left to right:
1. A water source or tank,
2. A first pump,
3. An injection component, e.g. fertilizer, comprised of:
   a. A tank,
   b. A stirrer, and
   c. An injector,
4. Valves associated with a first sector, referred to as Sector 1.
5. A second pump, and
6. A valve associated with a second sector, referred to as Sector 2.

In FIGS. 6a-11b this exemplary configuration is used to show different examples of operation of the system and the method of the invention as indicated below.

Figure 6A:
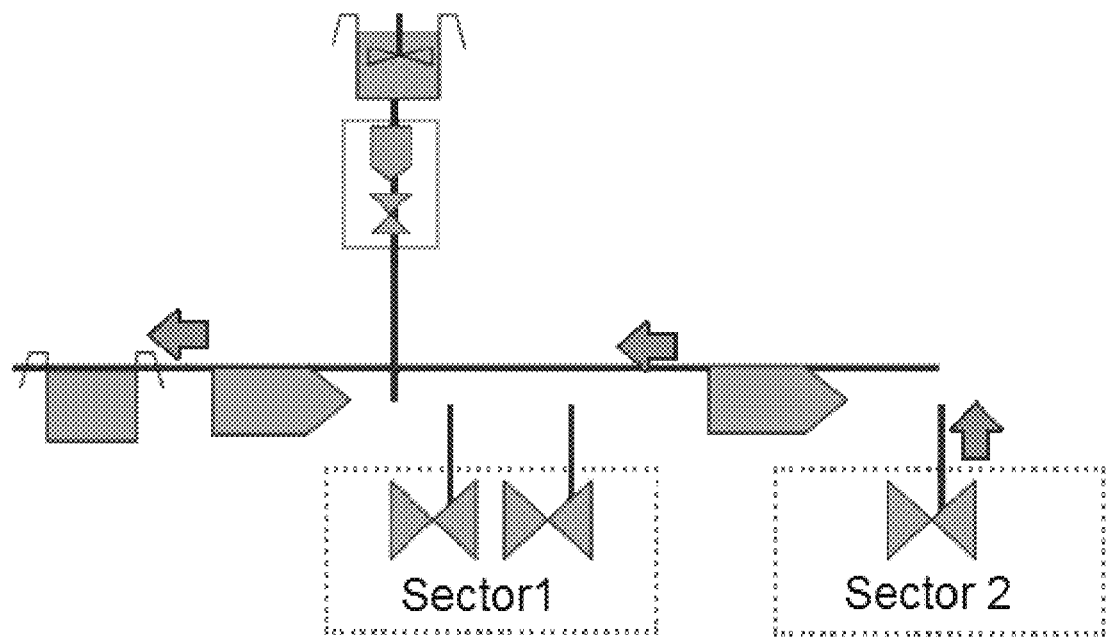
FIGS. 6*a*-6*j*: An example of the operation of the system and method of the invention for the irrigation of a sector is shown.

First, FIGS. 6a-6j show the operation of the exemplary system to start irrigation in Sector 2 and its subsequent stop. In FIG. 6a it can be seen that each hydraulic component communicates through its CX hydraulic communication interface, with the hydraulic component located directly upstream. This communication is done through messages sent by the controllers associated with each component downstream, communicated through the nodes, and processed by the upstream component controllers, which allow the system to recognize the state condition of each component. In the example of FIG. 6a, messages to start irrigation are sent by the components associated with the irrigation sector in question simultaneously between components, due to the start of irrigation.

Figure 6B:
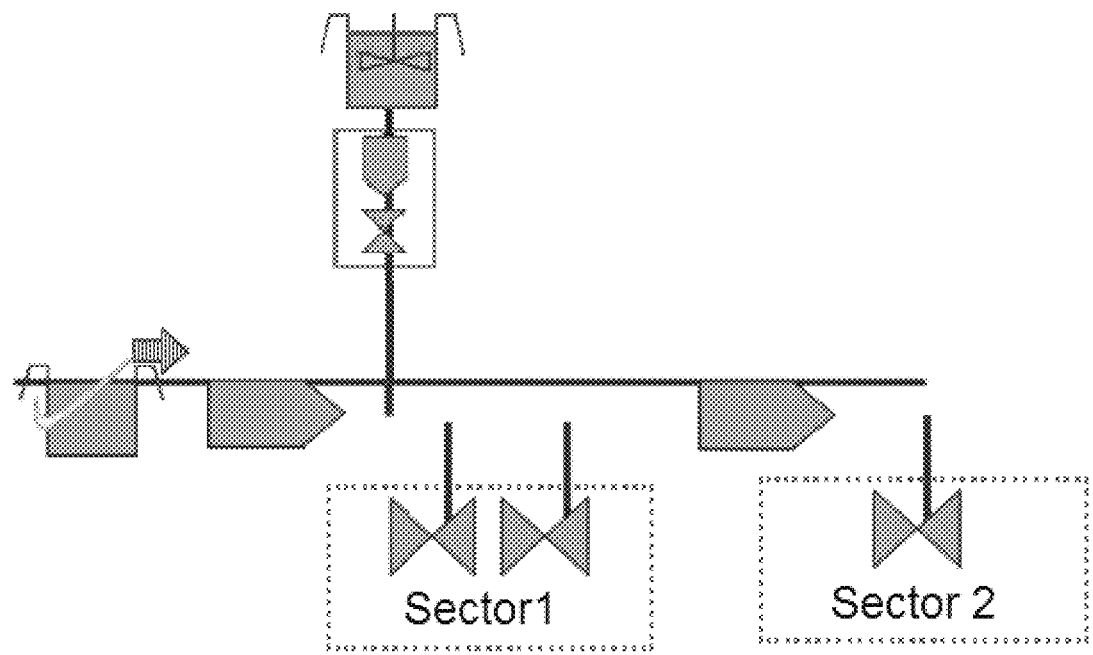
Figure 6C:
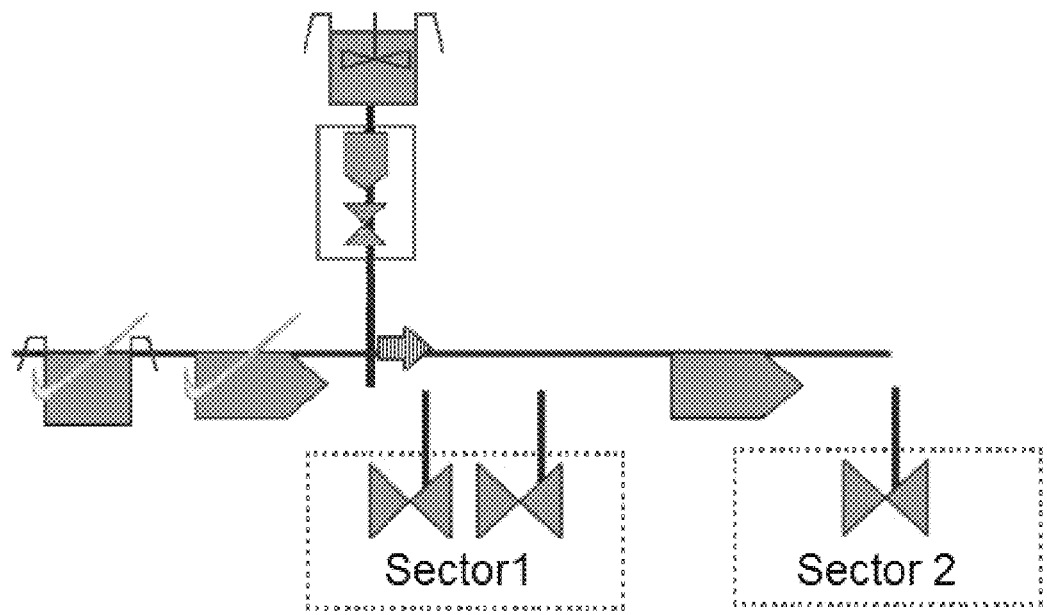
Figure 6D:
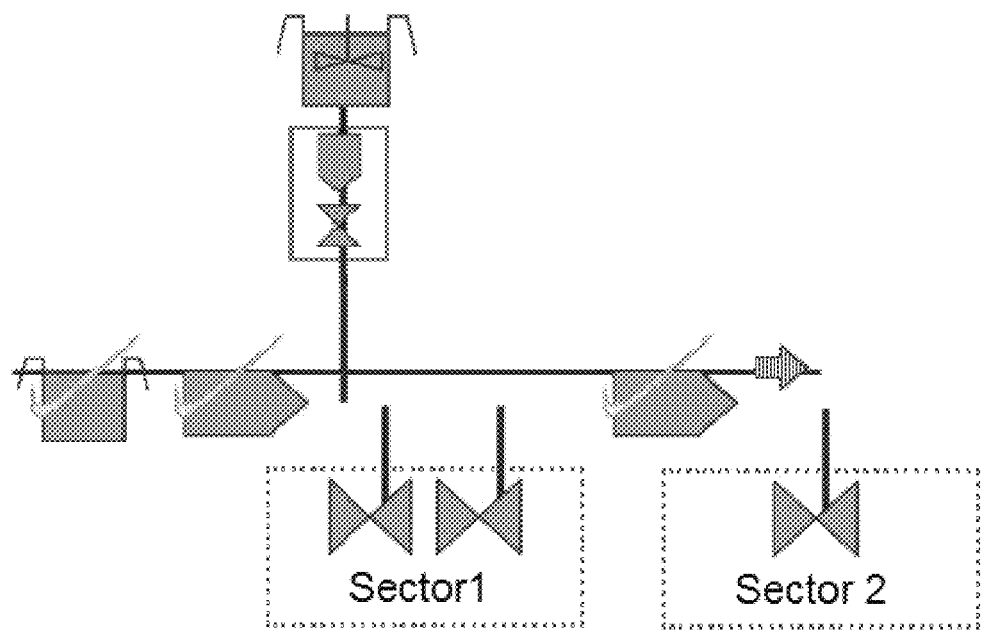

Then, FIGS. 6b to 6d show that each component starts its activation as a result of the requirement to start irrigation after receiving confirmation message on the operating or active state, from upstream to downstream; this allows verifying that the hydraulic communication among the participating components will take place smoothly.

Figure 6E:
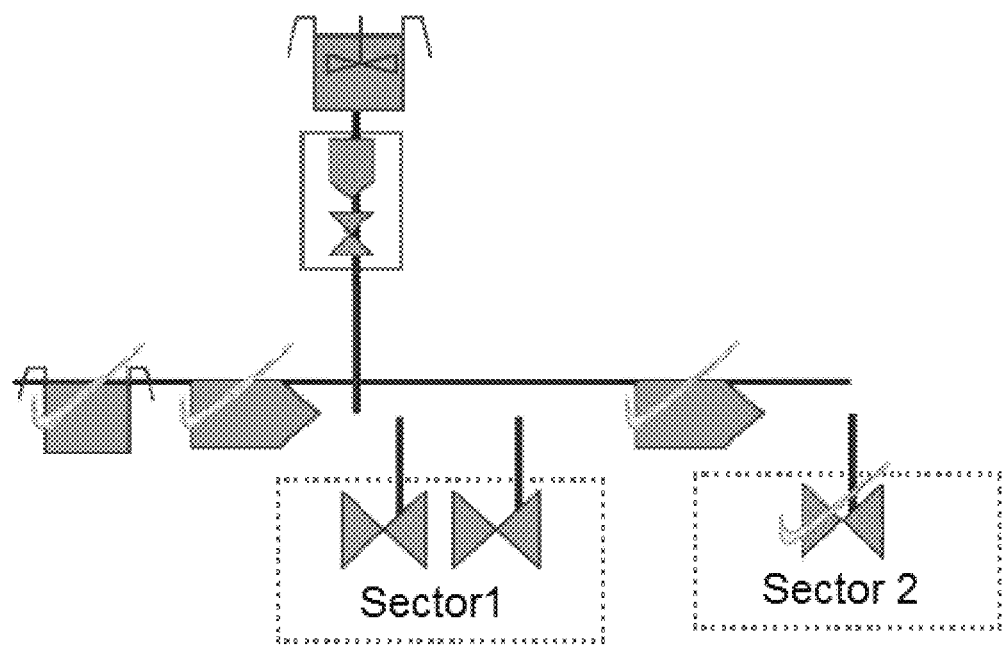
Figure 6F:
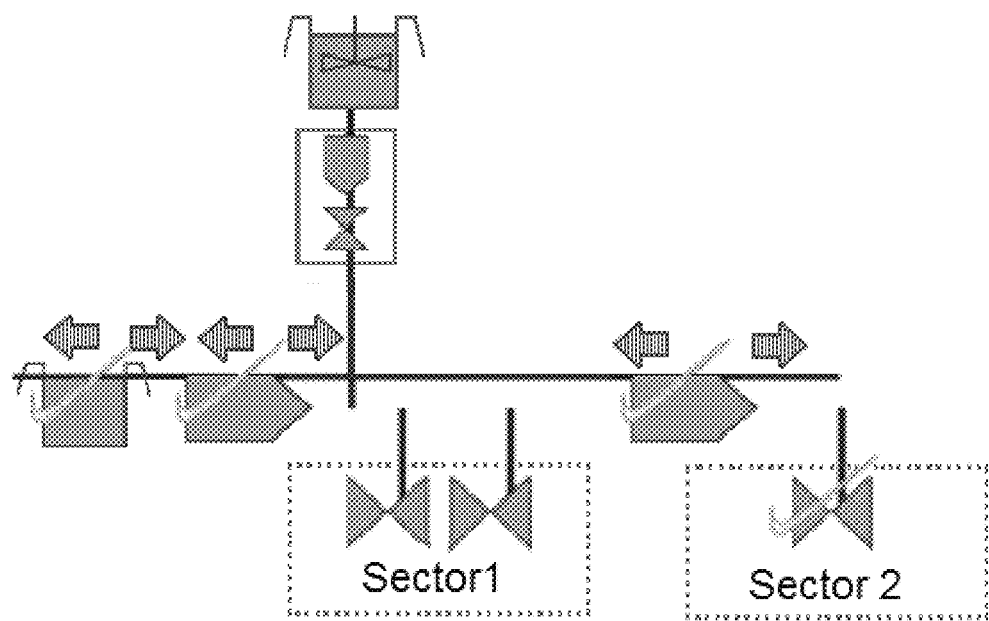

Later, once all components are activated, as shown in FIG. 6e, the irrigation of Sector 2 starts. At this point, one embodiment considers that communication among components is kept during irrigation, as shown in FIG. 6f wherein messages (of the ping/pong type) are set confirming the operation of the system among the participating hydraulic components.

Figure 6G:
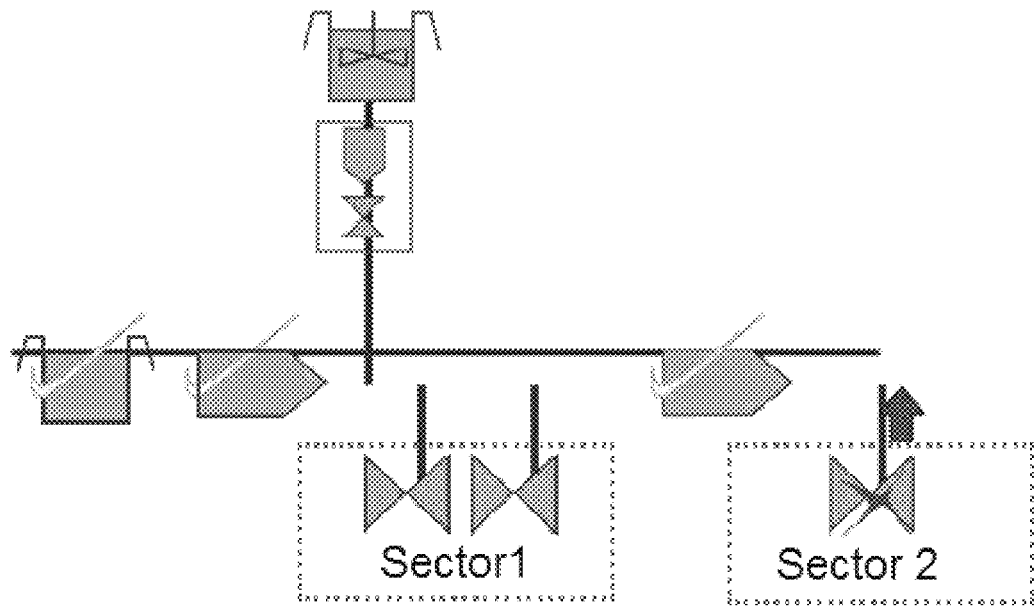
Figure 6H:
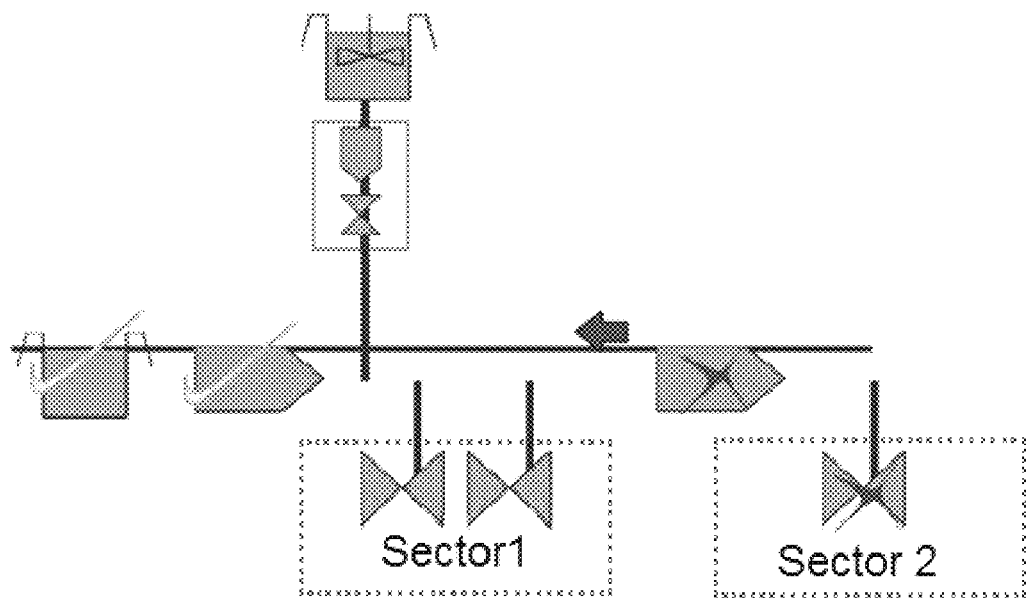
Figure 6I:
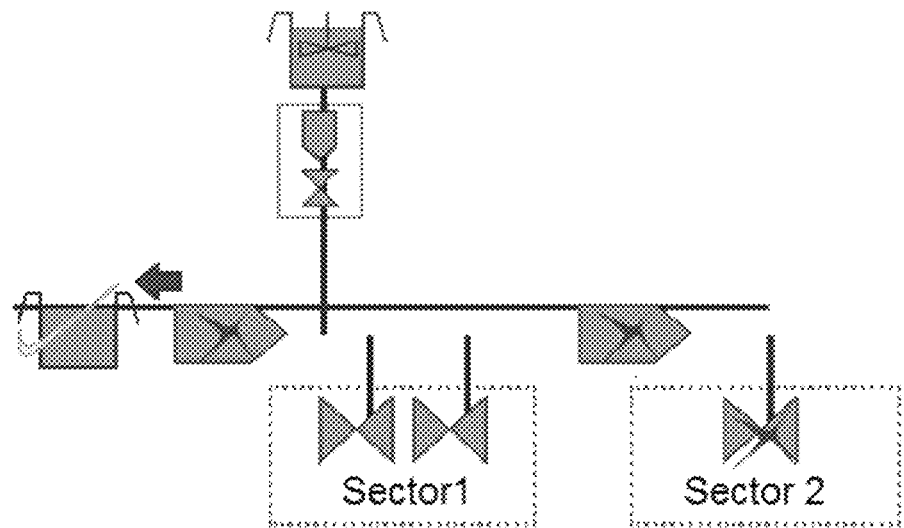
Figure 6J:
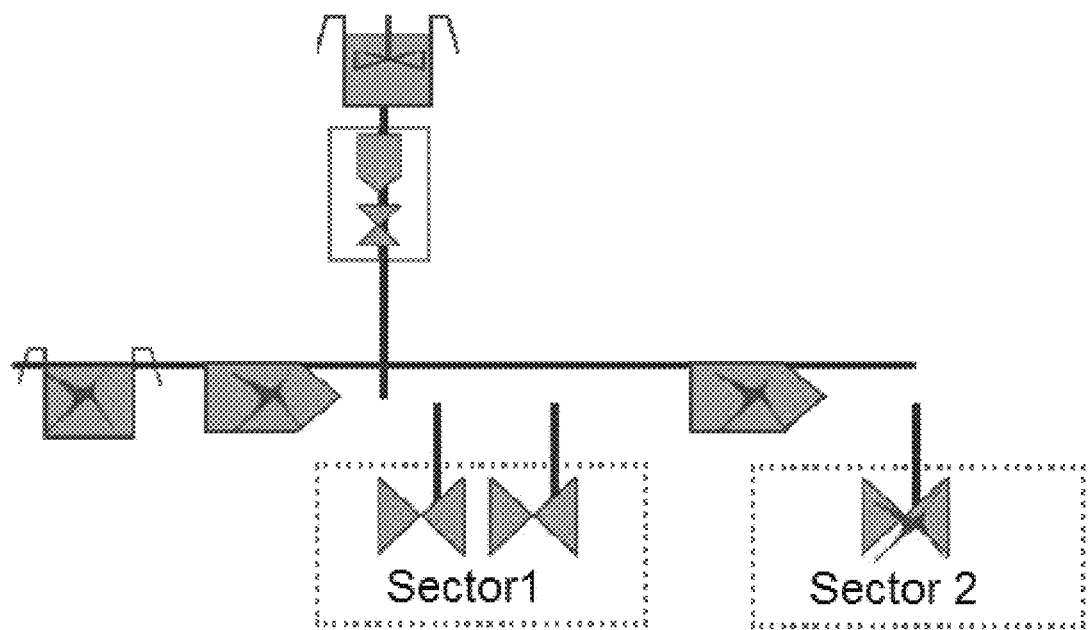

From this point, FIG. 6g shows the irrigation stop in Sector 2, either because of a fault in the irrigation components of the sector, by the end of the programmed irrigation and/or the action of a user of the system; this starts a chain of messages employing the hydraulic communication interface to adapt the system operation to the new condition. In this context, FIG. 6g shows that valves of sector 2 have stopped, communicating said state condition to the directly upstream component, in this case the second pump of the system. Then, FIGS. 6h and 6i show how the change in the state condition of the first component influences on the transfer of information among the other components of the system, always upstream, generating the preset actions, in this case the stopping of each component. Finally, in FIG. 6j it can be seen that all system components have stopped because of the change of state condition of valves of Sector 2.

Figure 7A:
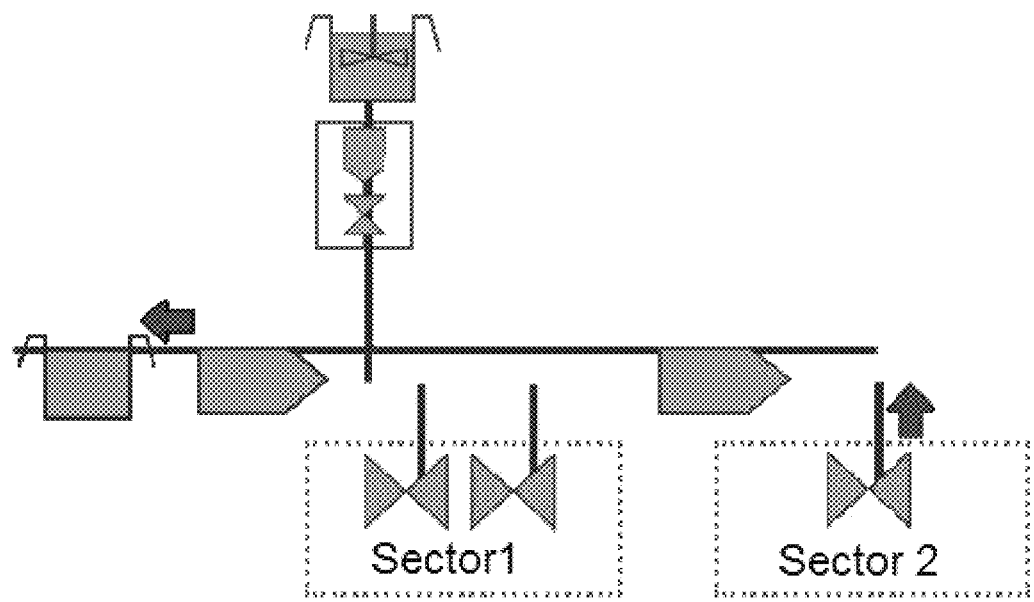
FIGS. 7*a*-7*d*: An example of the operation of the system and method of the invention to irrigate a sector with delay after the start of a pump is shown.

In another example of the invention, FIGS. 7a-7d show the start of irrigation whose operating parameter is a delay or "delay" of the second pump of the system, located upstream of the valve associated with Sector 2 wherein said delay can occur due to the system's operating conditions and/or pre-set by a user. In this context, FIG. 7a shows that the activation of irrigation in Sector 2 generates messages upstream in the valve associated with that sector and in the first pump of the system, wherein these messages are initiated by activation of these components.

Figure 7B:
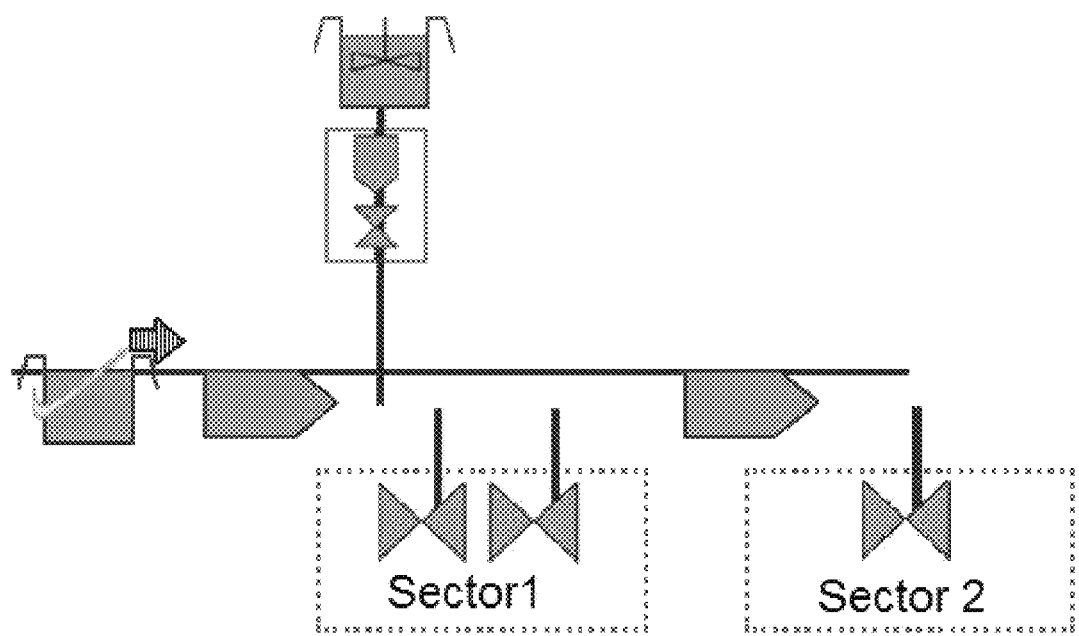
Figure 7C:
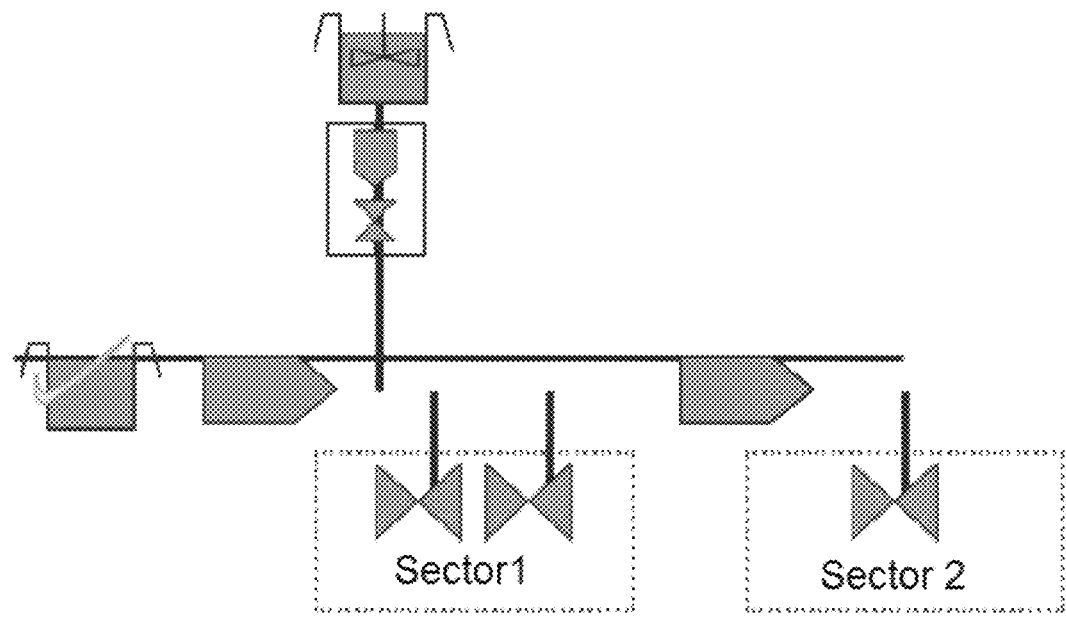

Then, according to the logic of successive communication, only the water source or tank located most upstream in the system is activated, as shown in FIGS. 7b and 7c, because said component is the only one, whose component directly downstream is ready for operation. In fact, although the valve associated with Sector 2 is ready for operation, the second pump located upstream has a delay programmed in its start-up, this being why said component does not communicate its activation to the upstream component, i.e., the first pump cannot start its operation until receiving the activation message from the downstream component.

Figure 7D:
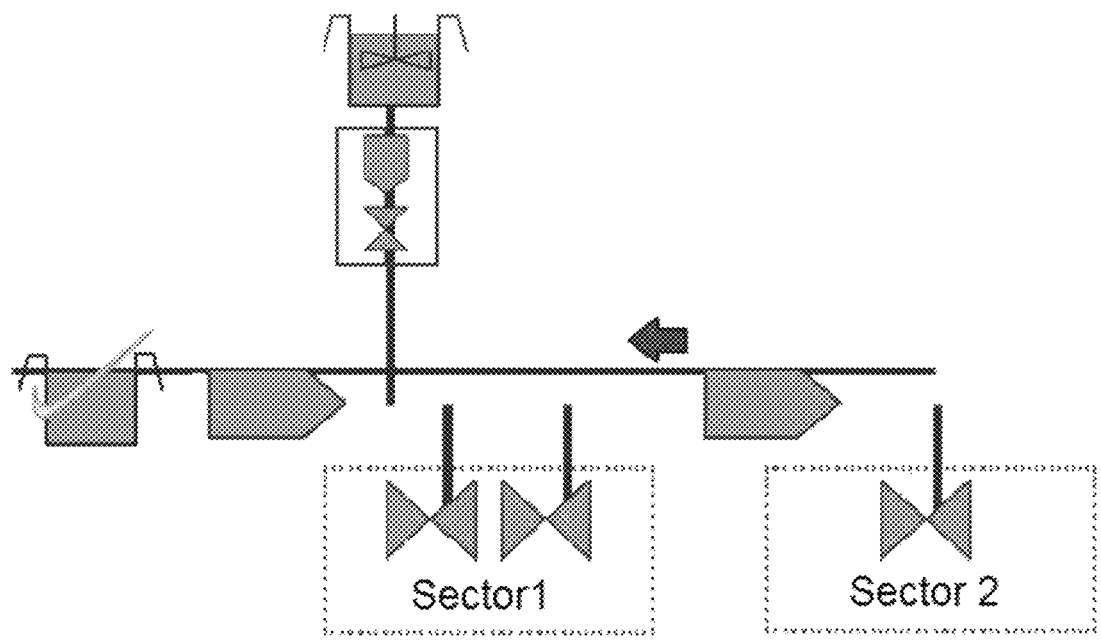

Subsequently, when the programmed delay of the second pump ends, said component communicates the start of irrigation its upstream component, as shown in FIG. 7d; this triggers the activation for irrigation of said water component upstream, that is, the first pump. From this point, the system activation occurs in the same manner as shown in FIGS. 6c to 6d according to the previous example.

Figure 8A:
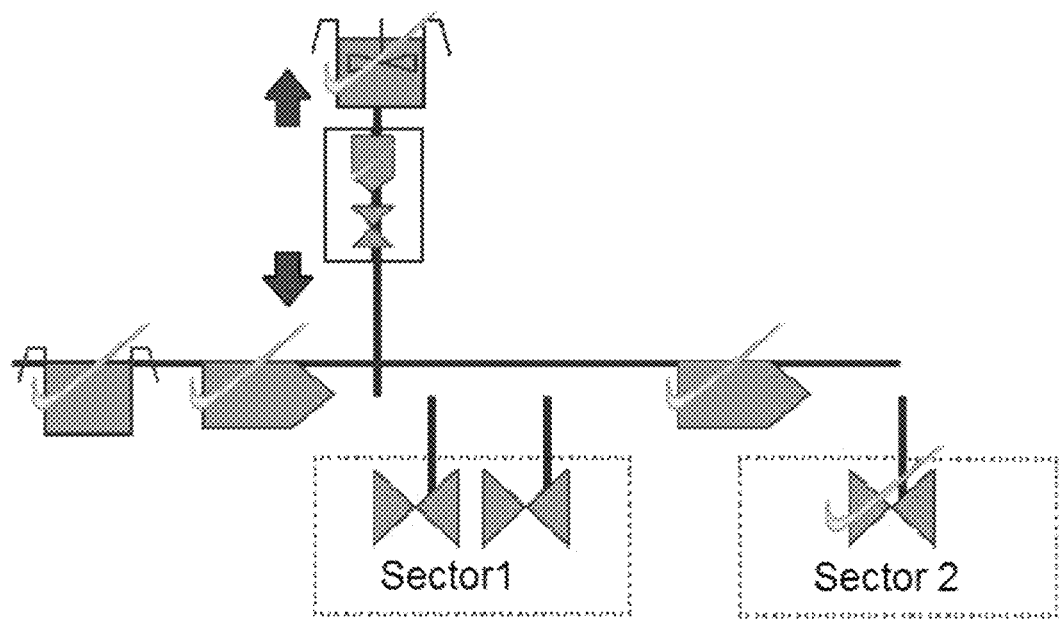
FIGS. 8*a*-8*f*: An example of the operation of the system and method of the invention for the irrigation with fertilizer of a sector is shown.
Figure 8B:
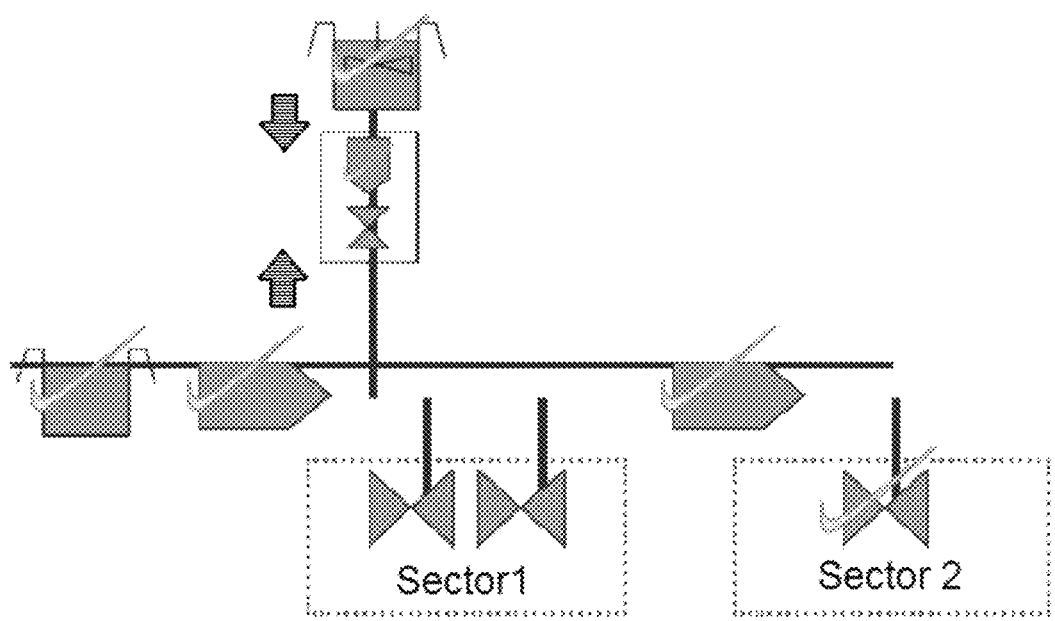
Figure 8C:
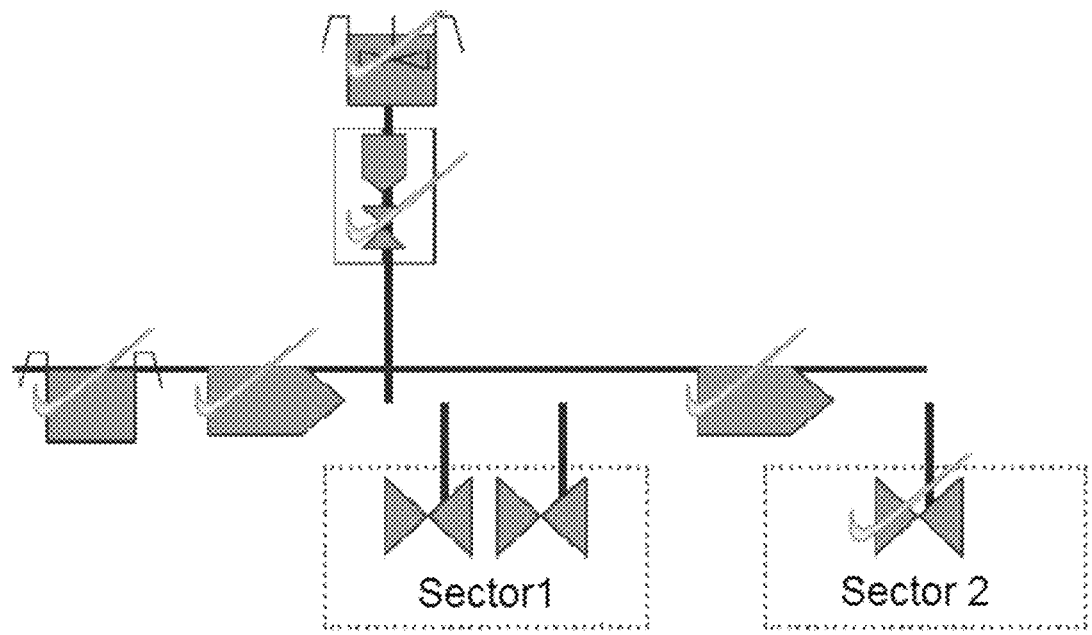
Figure 8D:
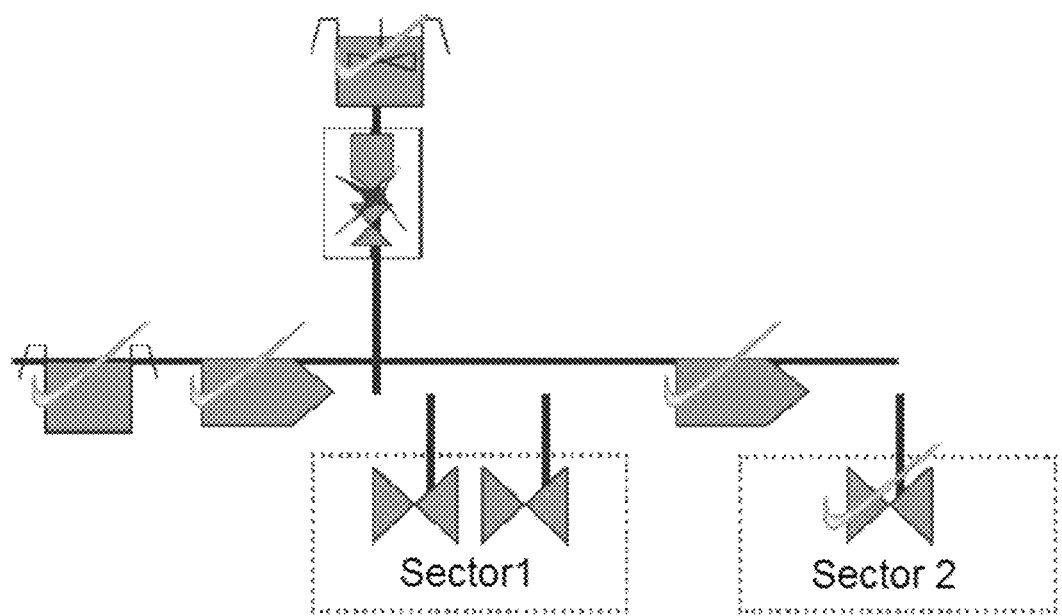

Another example of the invention shown in FIGS. 8a-8f comprises the irrigation of Sector 2, considering fertilizing irrigation during the system operation. Indeed, FIG. 8a shows the start of fertilizing irrigation once the system is in operation, either through programming and/or user intervention. In this respect, this example considers the irrigation system as operating for Sector 2, for example, by the process shown in FIGS. 6a to 6e; then, in a given time, the components associated with the injection of fertilizer become activated, for example, the injector's tank stirrer as shown in FIG. 8a. This change in the state condition of the stirrer triggers communication between the tank and the injector (FIGS. 8b and 8c), from which and from the system's operating parameters the fertilizing irrigation starts with the activation of the injector and its elements, as shown in FIG. 8c.

Figure 8E:
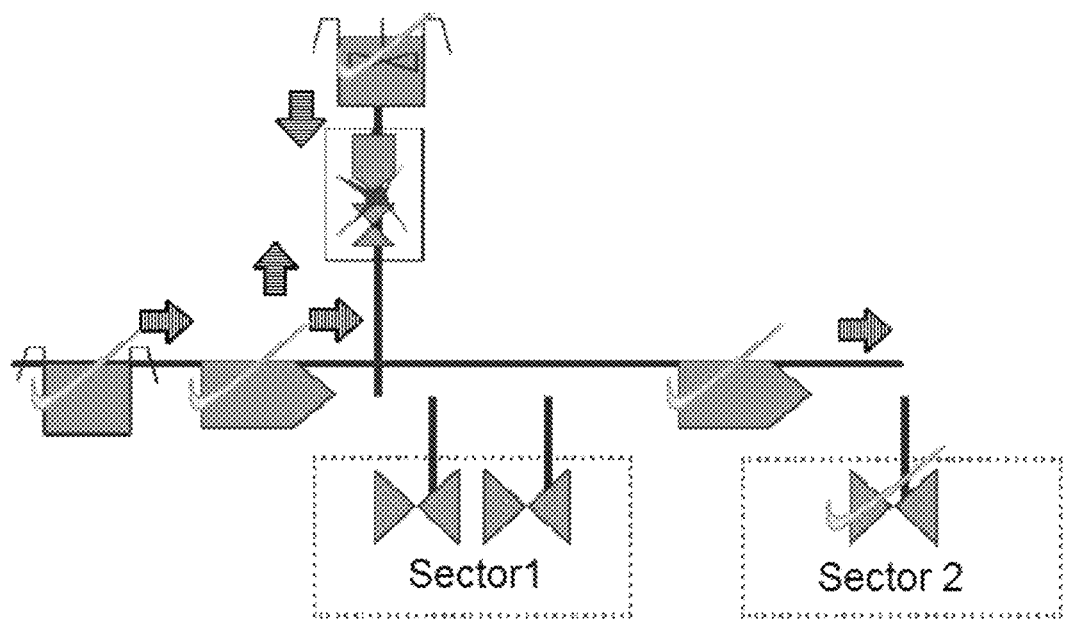
Figure 8F:
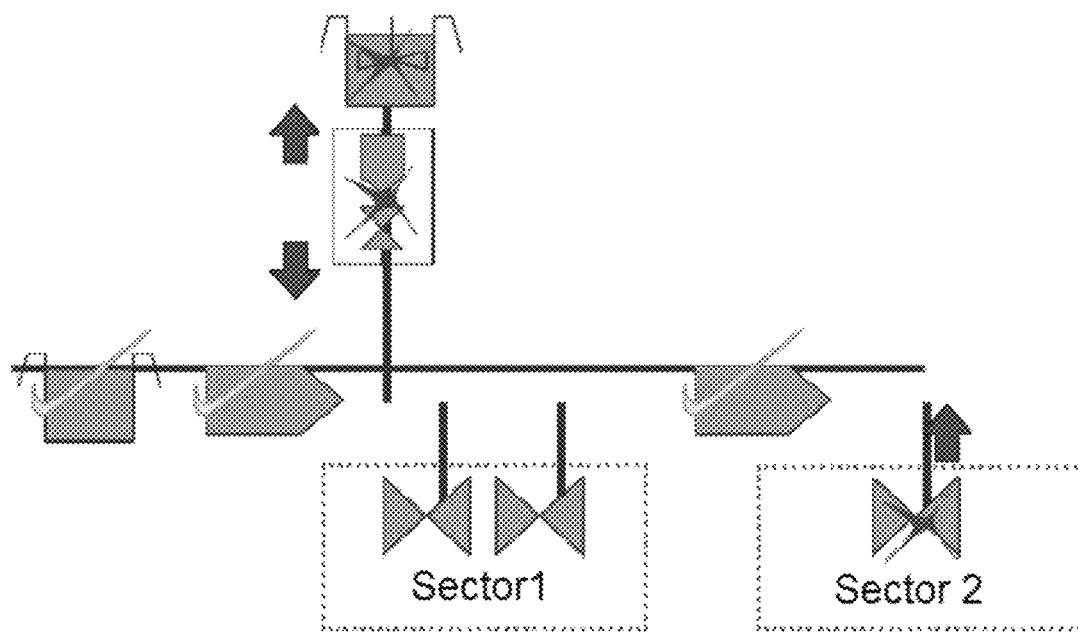

Then, once the preset time for fertilizing irrigation ends and/or by user intervention, the injector and/or stirrer associated with the fertilizing irrigation becomes deactivated (FIG. 8d), which after the communication process of each component's state conditions, shown in FIG. 8e, starts the deactivation of the components associated with fertilizing irrigation and with Sector 2, if the regular irrigation of said sector is also stopped as shown in FIG. 8f. From this point the stop of irrigation continues as in FIGS. 6h to 6j.

Figure 9A:
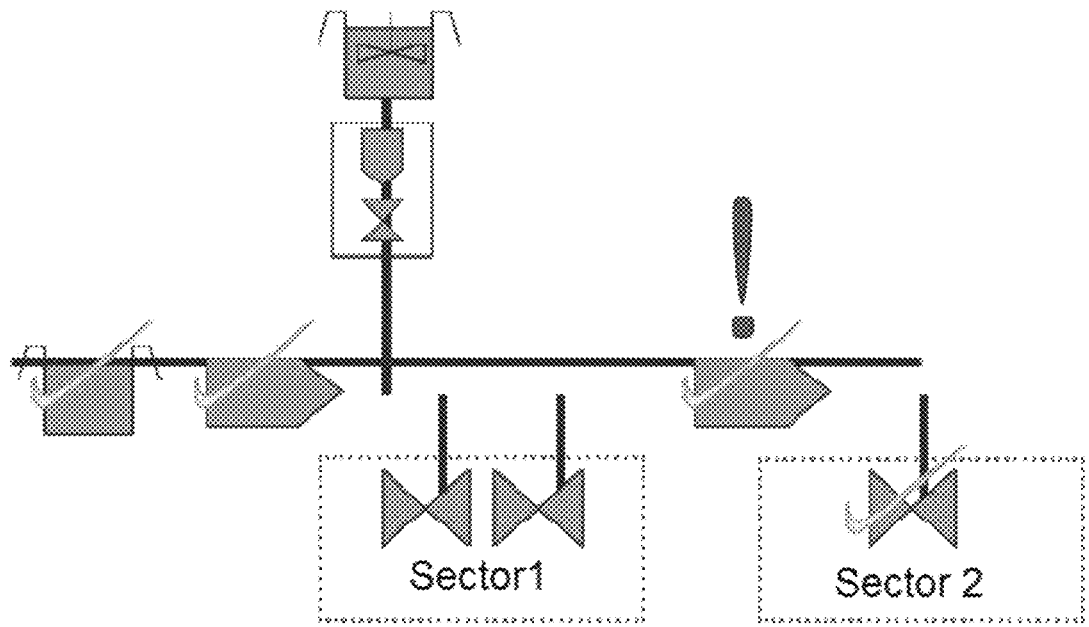
FIGS. 9*a*-9*d*: An example of the operation of the system and method of the invention compared with the activation of the alarm is shown.
Figure 9B:
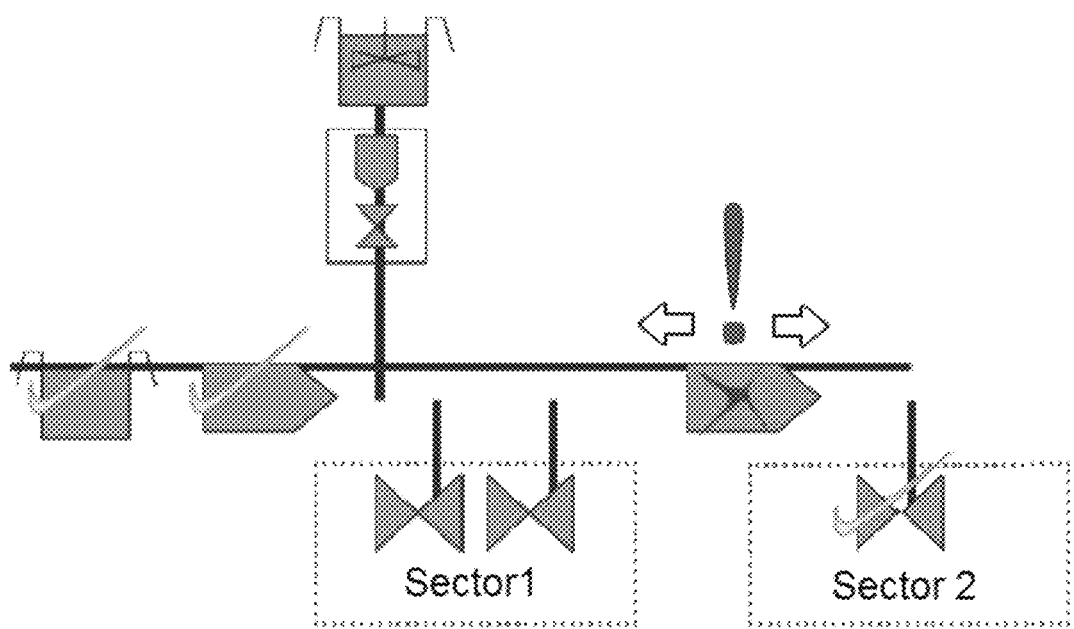
Figure 9C:
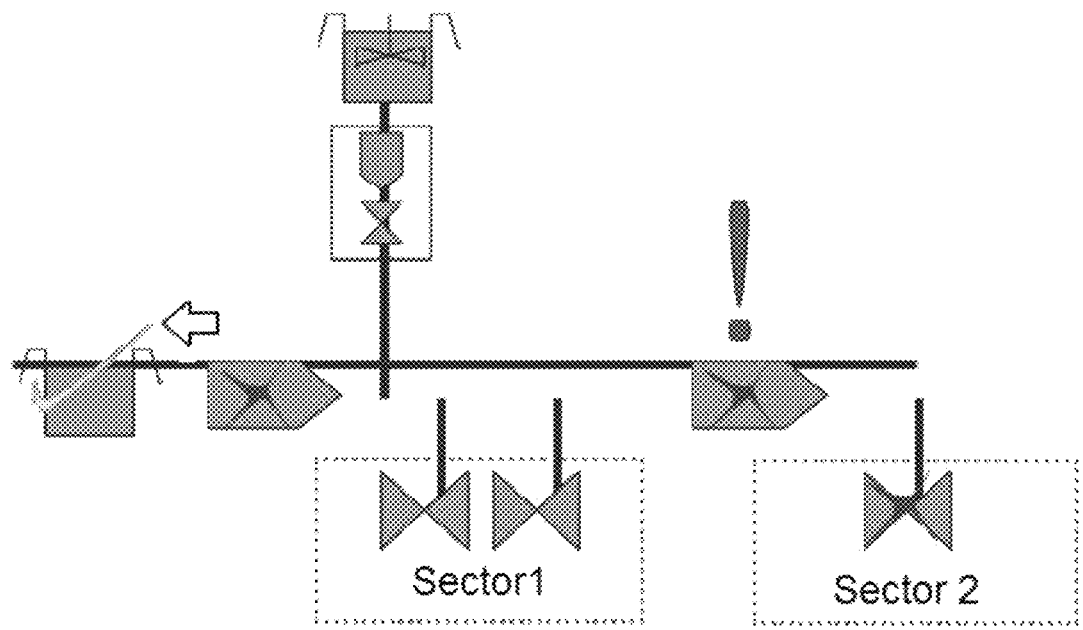
Figure 9D:
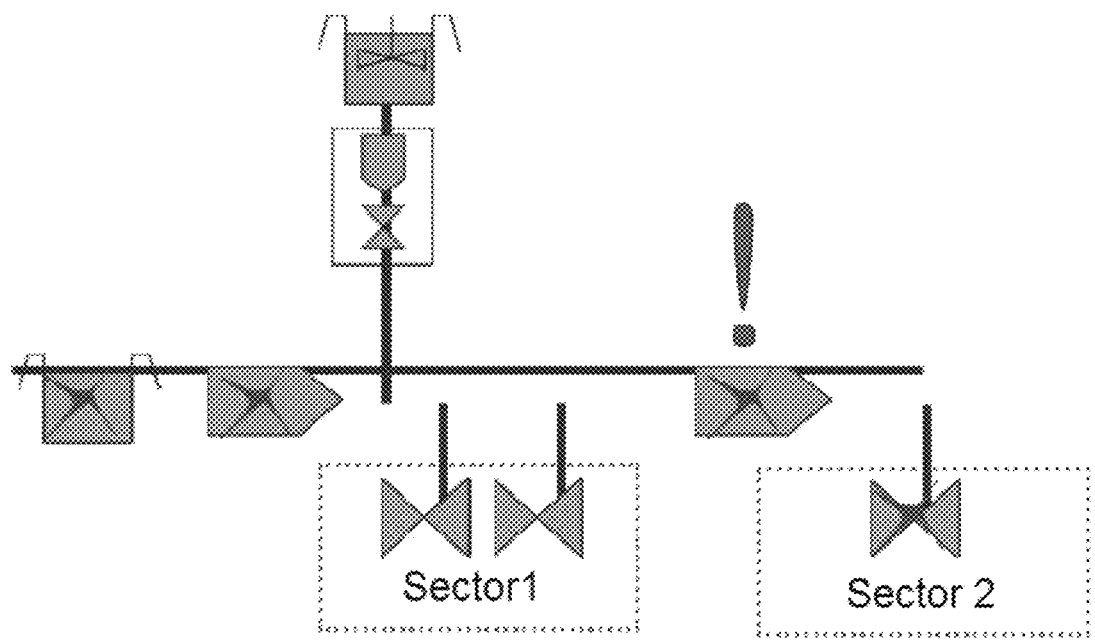

As for the system alarms, FIGS. 9a-9d show how the system and the method of the invention operate against the activation of a warning because of a system failure or by the change of a state condition preset in the system's operating parameters, for example overpressure. Here, the example of FIG. 9a shows the activation of a warning for the second pump of the system, wherein said system is under irrigation operation of Sector 2. At this point, the alarm activation in the second pump generates messages upstream and downstream of the component in question, triggering the stopping of that component as shown in FIG. 9b, if applicable. The messages communicated upstream and downstream are received by the components upstream and downstream of the second pump, with changes being triggered in the state condition that were programmed for the alarm in question. In this example, the change in the state condition triggers the stopping of the components upstream and downstream, as shown in FIGS. 9c and 9d; this ends with the full stoppage of the system.

Moreover, FIGS. 10a-10d show an example of the invention wherein a change of operation in the components to manual operation state is made, either programming it or by the user action. In this regard, the example of FIGS. 10a-10d includes an operating system for the irrigation of sector 2, as shown in FIGS. 6a-6f. Then, at a certain point, the source or tank located most upstream, the first pump and the valves associated with the Sector 1 become activated in manual operation, for example, for the manual irrigation of Sector 1. This change in the state condition is received by each component by external messages to the system (FIG. 10a), communicated through the nodes network from a server for example.

Figure 10A:
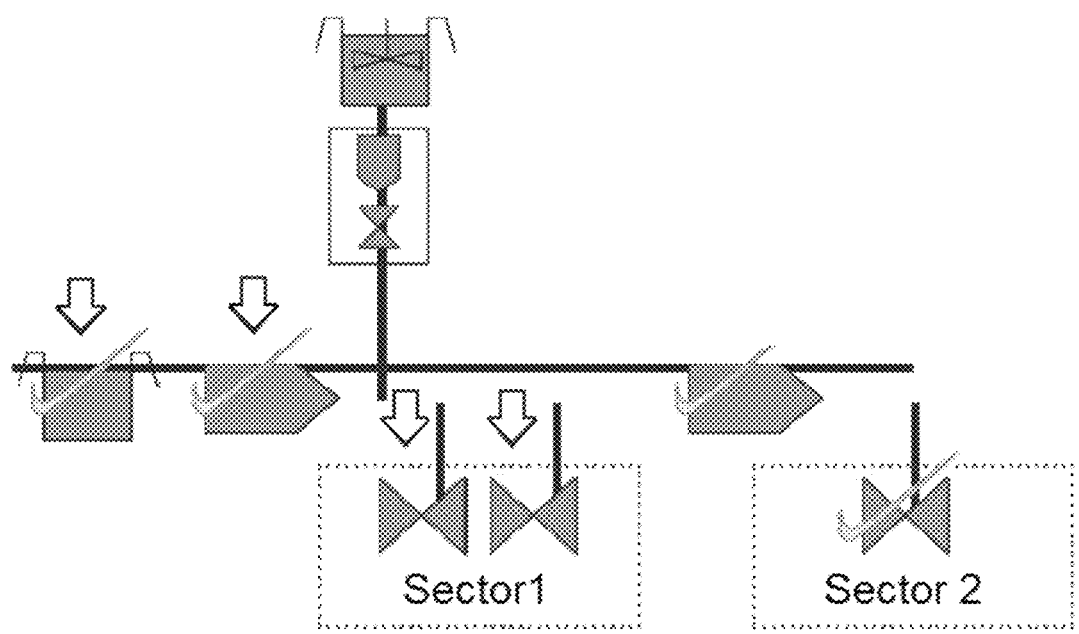
FIGS. 10*a*-10*d*: An example of the operation of the system and method of the invention for the manual irrigation of a see sector is shown.
Figure 10B:
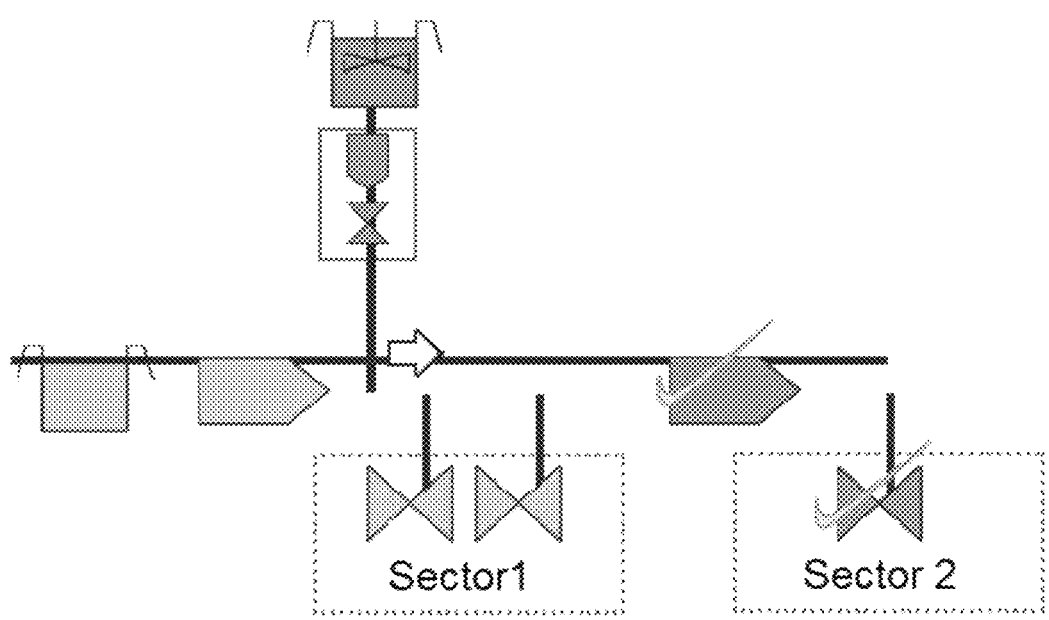
Figure 10C:
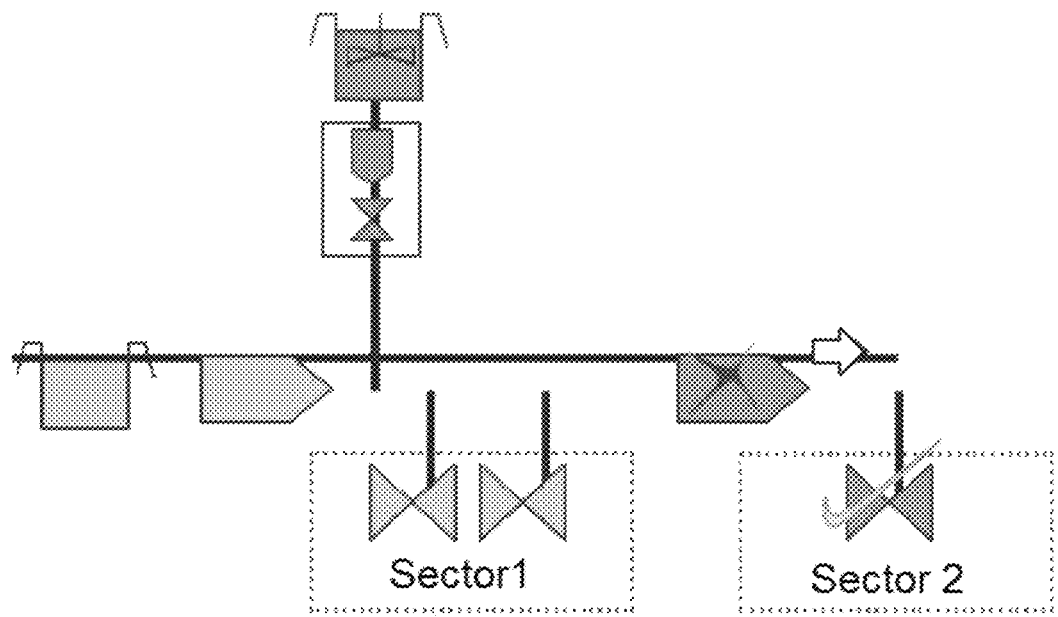
Figure 10D:
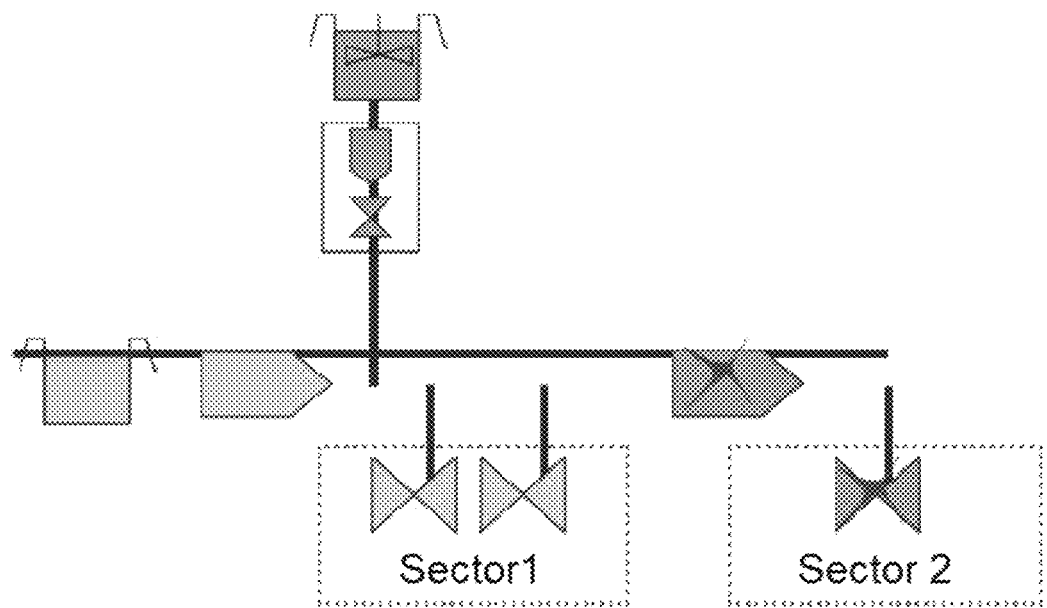

Then, in FIG. 10b it can be seen that the relevant components change their operating condition to manual operation, represented by the color change of the components in FIG. 10b. At this point, the change in the operating condition of the components triggers a message to the other components of the system, which according to this example, generates the stop of the components associated with the irrigation of Sector 2 (second pump and valve). Therefore, as shown in FIG. 10d, both the second pump and the valve of Sector 2 stop, ending the irrigation of said sector, while the components associated with the irrigation of Sector 1 are in manual mode, starting for example an irrigation operation for that Sector 1.

Figure 11A:
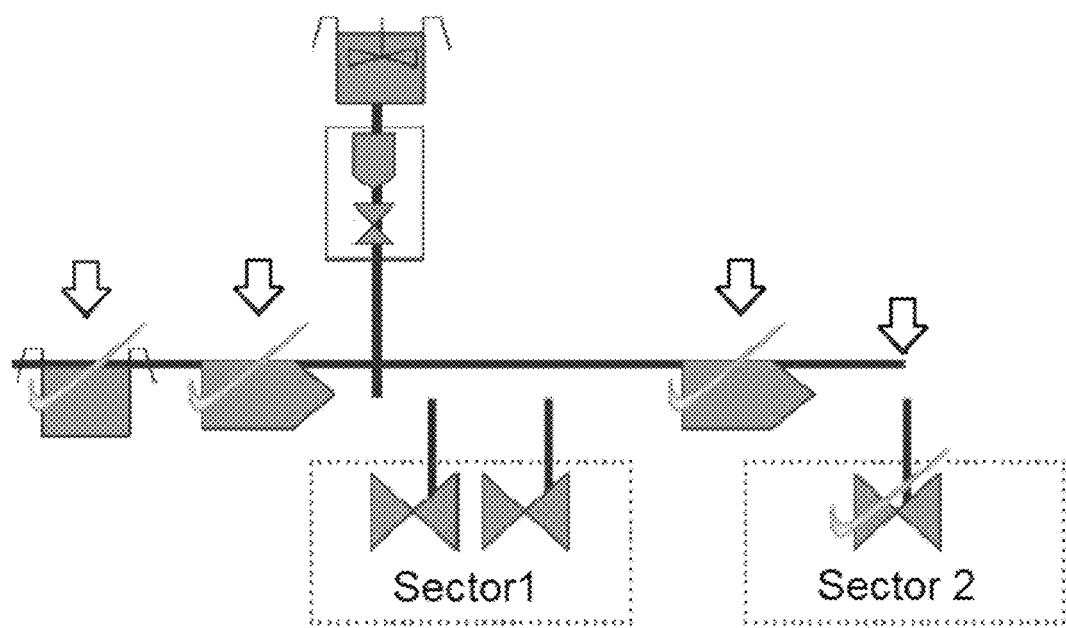
FIGS. 11*a*-11*b*: An example of the operation of the system and method of the invention for the stopping the irrigation is shown.
Figure 11B:
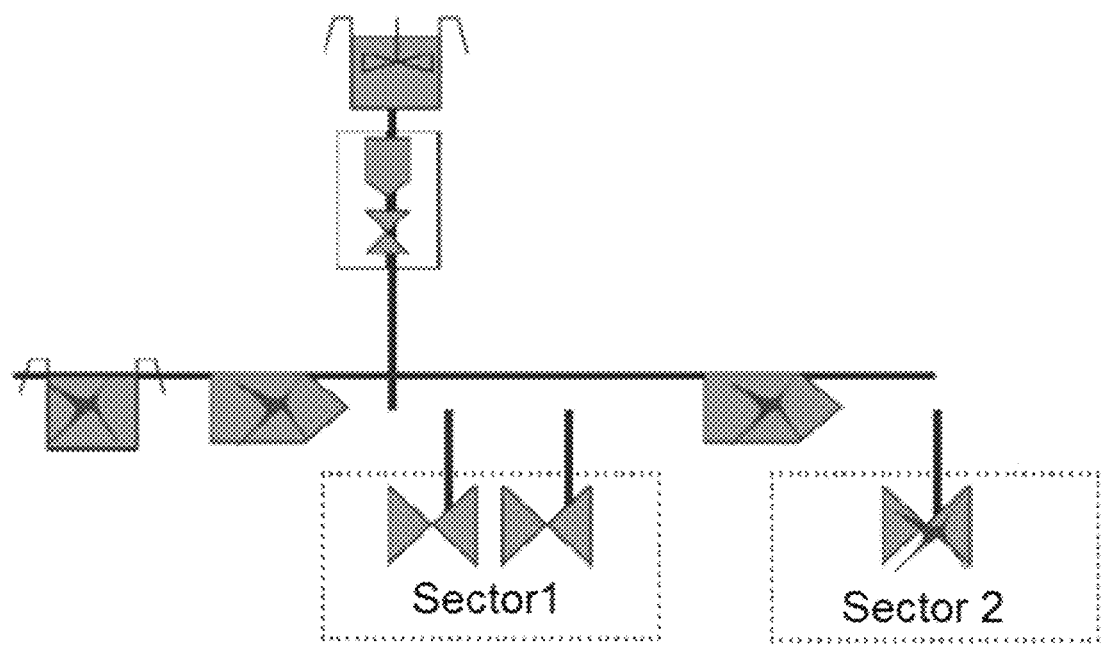
Figure 12:
FIG. 12 is a list of symbols used in other figures.
Figure 12:
Figure 12:
Figure 12:
Figure 12:
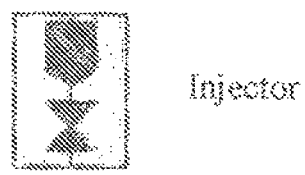
Figure 12:
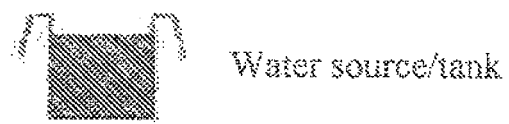
Figure 12:
Figure 12:
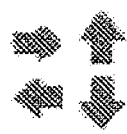
Figure 12:
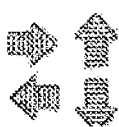
Figure 12:
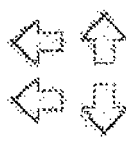
Figure 12:
Figure 12:
Figure 12:

FIGS. 11a and 11b show the activation of irrigation stopping for the whole system operating in the irrigation of Sector 2 as shown in FIGS. 6a to 6f. In this example, and as detailed above for the activation of the manual mode, external messages are received by each component or controller associated with such components in order to proceed with the individual deactivation of each hydraulic component. In this regard, FIG. 1 shows the reception of the external messages for each component, which immediately afterwards generates the deactivation of each component simultaneously, as shown in FIG. 11b. With this procedure the complete stop of the system of the invention is achieved.

Finally, it should be noted that the object of the examples above is to teach the operation of the system and method of the invention, showing how its control and monitoring configuration allows facilitating the management of water use or other fluid in processes wherein it is involved. In this context, although the examples and features shown above mainly refer to tasks of irrigation for faming lands, they are completely reproducible for other kind of processes in which management of fluid is involved, as for example industrial processes such as leaching.

The invention claimed is:

1. A method for the management of water or other fluid, which provides reliable monitoring and control of the use of water or other fluid in a territorial area divided into sectors, wherein said method is implemented in a system for the management of water or other fluid comprising:
   a hydraulic network located in the territorial area, comprising a set of hydraulic components hydraulically interconnected and located in the sectors of that territorial area, wherein each hydraulic component is associated with the area where it is located, and wherein each hydraulic component of the hydraulic network is defined by operating parameters and operating variables, and
   a network of nodes located in the territorial area, comprising a set of nodes interconnected to each other and localized in the sectors of that territorial area, wherein at least one first node of the nodes network is in communication with at least one sensor, at least one actuator and at least one controller in such a way that:
   said at least one sensor measures the operating variables and/or operating parameters of hydraulic components associated with said first node, obtaining operational information of said hydraulic components and/or of their environment,
   said at least one actuator comprises actuating device for setting operating parameters and/or operating variables of said hydraulic components associated with said first node, driving said hydraulic components,
   said at least one controller is in communication with the at least one sensor and the at least one actuator, comprising at least one transmitter/receiver to send/receive information to/from the nodes network and at least one processor to define a state condition of said hydraulic components,
   wherein the method comprises:
   defining, by the processor of at least one controller in communication with said first node, a state condition of at least one first hydraulic component of the hydraulic network associated with said first node, identifying the operation information of the first hydraulic component based on at least one sensor, actuator and/or controller associated with said first hydraulic component, wherein said operation information includes operating variables and/or operating parameters of the first hydraulic component;
   communicating, via the transmitter/receiver of the at least one controller in communication with said first node, said state condition from the first node to the nodes network;
   identifying at least one second hydraulic component of the hydraulic network associated with the first node or a second node, wherein the acting of driving said second hydraulic component, through the actuating device of at least one actuator associated with said second hydraulic component, allows to convert the state condition of the first hydraulic component into a preset state condition for said first hydraulic component;
   processing the state condition of the first hydraulic component in the first or second node associated with the second hydraulic component identified in the previous stage, particularly by at least one controller associated with said second hydraulic component;
   setting a response to said state condition by said at least one controller associated with the second hydraulic component;
   driving the second hydraulic component by the actuating device of the at least one actuator associated with said second hydraulic component, so that its operating variables and/or operating parameters of said second hydraulic component allow converting the state condition of the first hydraulic component into a preset state condition for said first hydraulic component, employing hydraulic communication between hydraulic components;
   defining, for a given set of sectors, control parameters of the hydraulic network located in said particular set of sectors, which are communicated to the nodes of the nodes network belonging to said set of sectors and, consequently, to a set of hydraulic components associated with said nodes, which are driven by the actuating device according to said control parameters; and defining for each hydraulic component, node and/or sector, monitoring parameters associated with the functioning and operation of the system, which are communicated through the nodes network to a user;

wherein the hydraulic communication between the hydraulic components is performed through a hydraulic interface for each hydraulic component which is associated with the hydraulic component directly connected upstream, wherein said communication interface defines the interaction relation between hydraulic components, setting a hydraulic dependent relationship between each hydraulic component and the hydraulic component directly located upstream, wherein said dependence relates a water supplying component to a receiving component that receives water from said supplier;

wherein by the hydraulic communication interface the relationship that defines the communication of the operation information of each hydraulic component is set, wherein said operation information can be classified into inputting operation information and outputting operation information, wherein the operation information of a first hydraulic component located downstream with respect to at least one second hydraulic component is called outputting operation information and it is used as inputting information in said at least one second hydraulic component; and wherein the step of identifying at least one second hydraulic component of the hydraulic network comprises going through the hydraulic network upstream the first hydraulic component using the hydraulic communication interface of each hydraulic component and driving one or more second hydraulic components upstream the first hydraulic component to respond to the state condition of said first hydraulic component located downstream and/or to provide information, wherein said hydraulic communication interface associates the outputting operation information of the first hydraulic component with the inputting operation information of the second hydraulic component connected directly upstream.

2. The method according to claim 1, wherein the control and monitoring parameters of the hydraulic network for each sector of the territorial area are defined by a user.

3. The method according to claim 1, wherein it also includes the delivery of sending alarms and/or warnings communicated to at least one user of the system, wherein the alarms are associated with the operation of the hydraulic network and its hydraulic components, communicating abnormal operating conditions and activating preset actions to correct these abnormal conditions, and wherein warnings are associated with the monitoring of the environment, such as climate and/or soil, communicating conditions of the environment preset as outside the normal parameters, wherein the communication of alarms and warnings to the at least one user of the system is performed by warning equipment deployed in the territorial area, messages sent to at least one server, text messages sent to the user and/or emails, wherein each alarm and/or warning is associated with at least one sensor, which measurement gave rise to the alarm and/or warning and, therefore, with at least one sector associated with said sensor, wherein the system for the management of water or other fluid allows defining operating parameters of alarms and warnings, as well as the activation conditions thereof, the times that will be used activating and actuating in view of a particular condition and/or the type of warning to be communicated in the activation of the alarm and/or warning, and wherein at least one system user is enabled to accept, reject or ignore alarms and warnings received.

4. The method according to claim 1, wherein it also comprises coordinating the information and communications in at least one gateway node in charge of the communication of the nodes network and acts as a bridge between said nodes network and at least one server, along with collecting and storing the values of sensors, actuators and/or controllers, sending such information to said at least one server, and wherein said communication in the nodes network may be wired and/or wireless.

5. The method according to claim 1, wherein the set of hydraulic components of the hydraulic network comprises at least one water source, at least one tank, at least one pump, at least one valve and/or at least one injector.

6. The method according to claim 1, wherein the at least one controller generates response messages from the at least one hydraulic component in view of the operation of the system, communicating such messages to the nodes network via the at least one transmitter/receiver, wherein said messages can communicate each other between hydraulic components upstream and/or downstream.

7. The method according to claim 1, wherein the outputting operation information of the first hydraulic component is processed by the at least one controller associated with the second hydraulic component for driving said second hydraulic component, giving response to the state condition of said first hydraulic component and/or to deliver information.

8. The method according to claim 1, wherein the operation information of the first hydraulic component, with its hydraulic dependence being defined through the hydraulic communication interface, is related to the inputting operation information from the at least second hydraulic component, modifying its operating parameters and/or state condition.

9. The method according to claim 1, wherein the state condition of a hydraulic component is defined based on information concerning the operating variables and/or operating parameters of said hydraulic component.

10. The method according to claim 1, wherein the system for the management of water or other fluid includes at least one sensor associated with the environment such as climate and/or soil, located in at least one sector of the territorial area, wherein said sensor associated with the environment is also associated to the sector wherein it is located and it is in communication with at least one node of the nodes network.

11. The method according to claim 1, wherein the state condition is communicated and processed by all network nodes that have dependence or relationship, generating a response in one or more hydraulic components of the hydraulic network.

12. The method according to claim 11, wherein the response from the at least one second hydraulic component to the state condition of the at least one first hydraulic component turns said state condition into a preset state condition for said first hydraulic component, wherein the preset state condition of each hydraulic component is determined by a user or by the system automatically.

13. The method according to claim 12, wherein the preset state condition refers to one of the following conditions:
operational or active—the hydraulic component is operating within the operating parameters as established;
off or inactive—the hydraulic component is inactive;
failure—the hydraulic component is in a wrong state;

forced stop—the hydraulic communication with the upstream component is interrupted or lost, i.e. there is no delivery of water or other fluid by said component;

manual—the hydraulic component is in manual mode; and automatic—the hydraulic component is in automatic mode, wherein each preset state condition may comprise substates.

14. The method according to claim 10, wherein it also comprises classifying the sectors into irrigation sectors, soil sectors and/or weather sectors, with each sector of the territorial area being classified according to one or a combination of said classifications, wherein:

the irrigation sector is that where at least one hydraulic component is located, comprising a set of control and monitoring parameters associated with the irrigation of said sector;

the soil sector is that where at least one sensor associated with the soil is located, comprising a set of control and monitoring parameters associated with the soil analysis; and the climate sector is that where at least one sensor associated with the weather is associated, comprising a set of control and monitoring parameters associated with the climate analysis of the environment.

15. A system for the management of water or other fluid providing reliable monitoring and control of water use or other fluid in a territorial area divided into sectors, implementing the method according to claim 1, wherein said system comprises:

a hydraulic network located in the territorial area, comprising a set of hydraulic components hydraulically interconnected and located in the sectors of that territorial area, wherein each hydraulic component is associated with the area where it is located, wherein each hydraulic component of the hydraulic network is defined by operating parameters and operating variables, and a network of nodes located in the territorial area, comprising a set of nodes interconnected each other and localized in the sectors of that territorial area, wherein:

at least one first node of the nodes network is in communication with at least one sensor, at least one actuator and at least one controller in such a way that said at least one sensor measures the operating variables and/or operating parameters of hydraulic components associated with said first node, obtaining operational information of said first hydraulic components and/or of their environment, said at least one actuator comprises actuating device for setting operating parameters and/or operating variables of said hydraulic components associated with said first node, driving said hydraulic components;

said at least one controller is in communication with the at least one sensor and the at least one actuator, comprising at least one transmitter/receiver to send/receive information to/from the nodes network and at least one processor to define a state condition hydraulic components.

* * * * *